(12) United States Patent
Matsui et al.

(10) Patent No.: US 7,930,896 B2
(45) Date of Patent: Apr. 26, 2011

(54) AIR CONDITIONING SYSTEM

(75) Inventors: Nobuki Matsui, Osaka (JP); Shuji Ikegami, Osaka (JP); Tomohiro Yabu, Osaka (JP)

(73) Assignee: Daikin Industries, Ltd., Osaka-Shi (JP)

( * ) Notice: Subject to any disclaimer, the term of this patent is extended or adjusted under 35 U.S.C. 154(b) by 1174 days.

(21) Appl. No.: 10/581,191

(22) PCT Filed: Oct. 20, 2004

(86) PCT No.: PCT/JP2004/015491
§ 371 (c)(1),
(2), (4) Date: Jun. 1, 2006

(87) PCT Pub. No.: WO2005/054752
PCT Pub. Date: Jun. 16, 2005

(65) Prior Publication Data
US 2008/0307814 A1    Dec. 18, 2008

(30) Foreign Application Priority Data

Dec. 4, 2003  (JP) ................. 2003-405600

(51) Int. Cl.
*F25B 27/00* (2006.01)
(52) U.S. Cl. ........................ 62/238.3; 62/271
(58) Field of Classification Search ............ 62/238.5, 62/271, 324.5, 476
See application file for complete search history.

(56) References Cited

U.S. PATENT DOCUMENTS
2007/0125115 A1*  6/2007  Matsui et al. ............... 62/331

FOREIGN PATENT DOCUMENTS

| JP | 7-265649 A | 10/1995 |
|---|---|---|
| JP | 8-000944 A | 1/1996 |
| JP | 8-944 A | 1/1996 |
| JP | 8-128681 A | 5/1996 |
| JP | 8-189667 A | 7/1996 |
| JP | 8-270980 A | 10/1996 |
| JP | 2001-201106 A | 7/2001 |
| WO | WO-03/029728 A1 | 4/2003 |

* cited by examiner

*Primary Examiner* — Melvin Jones
(74) *Attorney, Agent, or Firm* — Birch, Stewart, Kolasch & Birch, LLP

(57) ABSTRACT

A refrigerant circuit (40) is provided with an outdoor heat exchanger (54), an indoor heat exchanger (55) and two adsorption heat exchangers (56, 57). The indoor heat exchanger (55) is disposed in an indoor unit (11), while the outdoor heat exchanger (54) and the two adsorption heat exchangers (56, 57) are disposed in an outdoor unit (12). Moisture in outdoor air taken in the outdoor unit (12) is adsorbed by the adsorbent in the adsorption heat exchanger (56, 57) serving as an evaporator and the air is dehumidified. The dehumidified air is cooled by the indoor heat exchanger (55) serving as an evaporator and the air is supplied to the room space.

18 Claims, 11 Drawing Sheets

AIR CONDITIONING SYSTEM

TECHNICAL FIELD

This invention relates to air conditioning systems for coping with sensible heat load and latent heat load in a room space.

BACKGROUND ART

An air conditioning system for providing cooling and dehumidification of a room space is known in the art as disclosed in Patent Document 1 (WO03/029728 pamphlet). The air conditioning system includes a refrigerant circuit provided with an indoor heat exchanger as a utilization side heat exchanger and an outdoor heat exchanger as a heat-source side heat exchanger and runs a refrigeration cycle by circulating refrigerant through the refrigerant circuit. Further, the air conditioning system dehumidifies the room space by setting the refrigerant evaporation temperature in the indoor heat exchanger below the dew point of the room air and condensing moisture in the room air.

A dehumidifier is also known which includes heat exchangers each provided with an adsorbent on the surface thereof, as disclosed in Patent Document 2 (Published Unexamined Japanese Patent Application No. H07-265649). The dehumidifier includes two heat exchangers (adsorption heat exchangers) each provided with an adsorbent for moisture adsorption thereon and moisture desorption therefrom and operates so that one of the two heat exchangers dehumidifies air and the other is regenerated. During the operation, the adsorption heat exchanger adsorbing moisture is supplied with water cooled by a cooling tower while the heat exchanger being regenerated is supplied with warm water. Further, the dehumidifier supplies the air dehumidified by the above operation into the room space.

—Problems to be Solved—

As described above, the air conditioning system disclosed in Patent Document 1 copes with latent heat load in the room space by setting the refrigerant evaporation temperature in the indoor heat exchanger below the dew point of the room air and condensing moisture in the air. In other words, although indoor sensible heat load can be coped with even if the refrigerant evaporation temperature in the indoor heat exchanger is higher than the dew point of the room air, the refrigerant evaporation temperature is set at the lower value in order to cope with the latent heat load. This provides a large difference between high and low pressures in the refrigeration cycle and raises the input to the compressor, which leads to a problem that only a small COP (Coefficient Of Performance) can be attained.

On the other hand, the dehumidifier disclosed in Patent Document 2 supplies water cooled by the cooling tower, i.e., cooled water having not much lower temperature than the room temperature, to the heat exchanger. Therefore, the dehumidifier has a problem that it can cope with latent heat load but not sensible heat load in the room space.

The present invention has been made in view of the foregoing points and, therefore, its object is to provide an air conditioning system which can cope with both of sensible heat load and latent heat load in the room space and attain a high COP.

DISCLOSURE OF THE INVENTION

In the present invention, a refrigerant circuit is provided with a heat exchanger for controlling the air temperature and an adsorption heat exchanger for providing moisture adsorption and desorption to cope with the air in both the heat exchanger and adsorption heat exchanger and supply it into the room space.

More specifically, a first solution of the invention is intended for an air conditioning system, including a refrigerant circuit (40) provided with a heat-source side heat exchanger (54) and a utilization side heat exchanger (55), for running a refrigeration cycle in the refrigerant circuit (40) and supplying air having passed through the utilization side heat exchanger (55) to a room space to cope with sensible heat load and latent heat load in the room. Further, the refrigerant circuit (40) of the air conditioning system is further provided with an adsorption heat exchanger (56, 57) on the surface of which an adsorbent for moisture adsorption thereon and moisture desorption therefrom is carried, and the air conditioning system is configured to supply air having passed through the adsorption heat exchanger (56, 57) to the room space through the utilization side heat exchanger (55).

In the first solution, the refrigerant circuit (40) of the air conditioning system is provided with a single or plurality of heat-source side heat exchangers (54) and a single or plurality of utilization side heat exchangers (55). When, under this configuration, refrigerant circulates through the refrigerant circuit (40) to create a refrigeration cycle, the air flowing through the utilization side heat exchanger (55) is cooled or heated. Further, the refrigerant circuit (40) is also provided with a single or plurality of adsorption heat exchangers (56, 57). When, under this configuration, refrigerant circulates through the refrigerant circuit (40) to create a refrigeration cycle, the humidity of the air flowing through each adsorption heat exchanger (56, 57) is controlled by the adsorption or desorption action of the adsorbent carried on the adsorption heat exchanger (56, 57). Further, during the dehumidification cooling operation, for example, in summer, the air conditioning system can cool, in the utilization side heat exchanger (55), the air the moisture in which has been adsorbed by the adsorption heat exchanger (56, 57) and then supply the air to the room space. In this case, since the air flowing through the utilization side heat exchanger (55) has been dehumidified by the adsorption heat exchanger (56, 57), this reduces the amount of condensate during the cooling of the utilization side heat exchanger (55) as compared with when dehumidification is not implemented by the adsorption heat exchanger (56, 57).

A second solution of the invention is intended for an air conditioning system, including a refrigerant circuit (40) provided with a heat-source side heat exchanger (54) and a utilization side heat exchanger (55), for running a refrigeration cycle in the refrigerant circuit (40) and supplying air having passed through the utilization side heat exchanger (55) to a room space to cope with sensible heat load and latent heat load in the room. Further, the refrigerant circuit (40) of the air conditioning system is further provided with an adsorption heat exchanger (56, 57) on the surface of which an adsorbent for moisture adsorption thereon and moisture desorption therefrom is carried, and the air conditioning system is configured to supply air having passed through the utilization side heat exchanger (55) to the room space through the adsorption heat exchanger (56, 57).

In the second solution, like the first solution, the air flowing through the utilization side heat exchanger (55) is cooled or heated. Further, the humidity of the air flowing through the adsorption heat exchanger (56, 57) is controlled by the adsorption or desorption action of the adsorbent carried on the adsorption heat exchanger (56, 57).

Further, during the dehumidification cooling operation, for example, in summer, the air conditioning system can dehumidify, in the adsorption heat exchanger (56, 57), the air having been cooled by the utilization side heat exchanger (55) and then supply the air to the room space. In this case, since the air flowing through the adsorption heat exchanger (56, 57) has been cooled by the utilization side heat exchanger (55), it has a lower temperature than when cooling is not implemented by the utilization side heat exchanger (55). This enhances the moisture adsorption capacity of the adsorbent of the adsorption heat exchanger (56, 57).

Furthermore, during the humidification heating operation, for example, in winter, the air conditioning system can humidify, in the adsorption heat exchanger (56, 57), the air having been heated by the utilization side heat exchanger (55) and then supply the air to the room space. In this case, since the air flowing through the adsorption heat exchanger (56, 57) has been heated by the utilization side heat exchanger (55), it has a higher temperature than when heating is not implemented by the utilization side heat exchanger (55). This enhances the moisture desorption capacity of the adsorbent of the adsorption heat exchanger (56, 57).

An third solution of the invention is intended for an air conditioning system, including a refrigerant circuit (40) provided with a heat-source side heat exchanger (54) and a utilization side heat exchanger (55), for running a refrigeration cycle in the refrigerant circuit (40) and supplying air having passed through the utilization side heat exchanger (55) to a room space to cope with sensible heat load and latent heat load in the room. Further, the refrigerant circuit (40) of the air conditioning system is further provided with an adsorption heat exchanger (56, 57) on the surface of which an adsorbent for moisture adsorption thereon and moisture desorption therefrom is carried, and the air conditioning system is configured to allow the air to concurrently flow in parallel flows through the utilization side heat exchanger (55) and the adsorption heat exchanger (56, 57) and supply the flows of air to the room space.

In the third solution, like the first solution, the air flowing through the utilization side heat exchanger (55) is cooled or heated. Further, the humidity of the air flowing through the adsorption heat exchanger (56, 57) is controlled by the adsorption or desorption action of the adsorbent carried on the adsorption heat exchanger (56, 57).

Further, in the air conditioning system, the parallel flows of air concurrently go into the utilization side heat exchanger (55) and the adsorption heat exchanger (56, 57), respectively. One of the flows of air passes through the utilization side heat exchanger (55) and is then supplied to the room space. The other flow of air passes through the adsorption heat exchanger (56, 57) and is then supplied to the room space.

A fourth solution of the invention is intended for an air conditioning system, including a refrigerant circuit (40) provided with a heat-source side heat exchanger (54) and a utilization side heat exchanger (55), for running a refrigeration cycle in the refrigerant circuit (40) and supplying air having passed through the utilization side heat exchanger (55) to a room space to cope with sensible heat load and latent heat load in the room. Further, the refrigerant circuit (40) of the air conditioning system is further provided with an adsorption heat exchanger (56, 57) on the surface of which an adsorbent for moisture adsorption thereon and moisture desorption therefrom is carried, and the air conditioning system is configured to discharge air having passed through the adsorption heat exchanger (56, 57) to the outdoor space through the heat-source side heat exchanger (54).

In the fourth solution, during the humidification heating operation, for example, in winter, the air conditioning system can cool, in the heat-source side heat exchanger (54), the air having applied moisture to the adsorbent of the adsorption heat exchanger (56, 57) and then discharge the air to the outdoor space. In this case, since the air flowing through the heat-source side heat exchanger (54) has been dehumidified by the adsorption heat exchanger (56, 57), this reduces the amount of condensate during the cooling of the heat-source side heat exchanger (54) as compared with when dehumidification is not implemented by the adsorption heat exchanger (56, 57).

A fifth solution of the invention is intended for an air conditioning system, including a refrigerant circuit (40) provided with a heat-source side heat exchanger (54) and a utilization side heat exchanger (55), for running a refrigeration cycle in the refrigerant circuit (40) and supplying air having passed through the utilization side heat exchanger (55) to a room space to cope with sensible heat load and latent heat load in the room. Further, the refrigerant circuit (40) of the air conditioning system is further provided with an adsorption heat exchanger (56, 57) on the surface of which an adsorbent for moisture adsorption thereon and moisture desorption therefrom is carried, and the air conditioning system is configured to discharge air having passed through the heat-source side heat exchanger (54) to the outdoor space through the adsorption heat exchanger (56, 57).

In the fifth solution, during the dehumidification cooling operation, for example, in summer, the air conditioning system can desorb moisture from the adsorbent of the adsorption heat exchanger (56, 57) using the air having been heated by the heat-source side heat exchanger (54) and then discharge the air to the outdoor space. In this case, since the air flowing through the adsorption heat exchanger (56, 57) has been heated by the heat-source side heat exchanger (54), it has a higher temperature than when heating is not implemented by the heat-source side heat exchanger (54). This enhances the moisture desorption capacity of the adsorbent of the adsorption heat exchanger (56, 57).

Further, during the humidification heating operation, for example, in winter, the air conditioning system can dehumidify, in the adsorption heat exchanger (56, 57), the air having been cooled by the heat-source side heat exchanger (54) and then discharge the air to the outdoor space. In this case, since the air flowing through the adsorption heat exchanger (56, 57) has been cooled by the heat-source side heat exchanger (54), it has a lower temperature than when cooling is not implemented by the heat-source side heat exchanger (54). This enhances the moisture adsorption capacity of the adsorbent of the adsorption heat exchanger (56, 57).

A sixth solution of the invention is intended for an air conditioning system, including a refrigerant circuit (40) provided with a heat-source side heat exchanger (54) and a utilization side heat exchanger (55), for running a refrigeration cycle in the refrigerant circuit (40) and supplying air having passed through the utilization side heat exchanger (55) to a room space to cope with sensible heat load and latent heat load in the room. Further, the refrigerant circuit (40) of the air conditioning system is further provided with an adsorption heat exchanger (56, 57) on the surface of which an adsorbent for moisture adsorption thereon and moisture desorption therefrom is carried, and the air conditioning system is configured to allow the air to concurrently flow in parallel flows through the heat-source side heat exchanger (54) and the adsorption heat exchanger (56, 57) and discharge the flows of air to the outdoor space.

In the sixth solution, the parallel flows of air concurrently go into the heat-source side heat exchanger (54) and the adsorption heat exchanger (56, 57), respectively. One of the flows of air passes through the heat-source side heat exchanger (54) and is then discharged to the outdoor space. The other flow of air passes through the adsorption heat exchanger (56, 57) and is then discharged to the outdoor space.

A seventh solution of the invention is directed to the air conditioning system of any one of the first to sixth solutions, wherein the adsorption heat exchanger (56, 57) comprises a first adsorption heat exchanger (56) and a second adsorption heat exchanger (57), and the air conditioning system is configured to repeatedly alternate a first mode in which the air having passed through the first adsorption heat exchanger (56) is supplied to the room space and concurrently the air having passed through the second adsorption heat exchanger (57) is discharged to the outdoor space and a second mode in which the air having passed through the second adsorption heat exchanger (57) is supplied to the room space and concurrently the air having passed through the first adsorption heat exchanger (56) is discharged to the outdoor space.

In the seventh solution, the refrigerant circuit (40) of the air conditioning system is provided with a first adsorption heat exchanger (56) and a second adsorption heat exchanger (57). In the air conditioning system, an adsorption action for adsorbing moisture in the air takes place in one of the first adsorption heat exchanger (56) and the second adsorption heat exchanger (57) and concurrently a desorption action (regeneration action) for desorbing moisture from the adsorbent takes place in the other of the first adsorption heat exchanger (56) and the second adsorption heat exchanger (57).

—Effects—

In the present invention, the refrigerant circuit (40) is provided with one or more adsorption heat exchangers (56, 57) and the air conditioning system controls the humidity of the air by passing the air through the adsorption heat exchanger (56, 57). Specifically, the air conditioning system dehumidifies the air not by condensing moisture in the air as in the known system but by adsorbing moisture in the air on the adsorbent. This eliminates the need to set the refrigerant evaporation temperature in the refrigeration cycle below the air dew point unlike the known system and enables the air to be dehumidified even if the refrigerant evaporation temperature is set at the air dew point or higher. Therefore, according to the present invention, the refrigerant evaporation temperature in the refrigeration cycle can be set higher than in the known system even when the air is dehumidified, which reduces the difference between high and low pressures in the refrigeration cycle. As a result, power required for refrigerant compression can be reduced, thereby improving the COP of the refrigeration cycle.

Particularly in the first solution, during the dehumidification cooling operation, the air conditioning system is configured to cool, in the utilization side heat exchanger (55), the air the moisture in which has been adsorbed by the adsorption heat exchanger (56, 57) and then supply it to the room space. In this case, since the air being cooled by the utilization side heat exchanger (55) has been dehumidified by the adsorption heat exchanger (56, 57), this reduces the amount of condensate produced near the utilization side heat exchanger (55) with the air cooling. Therefore, drain water can be restrained from being produced in the utilization side heat exchanger (55) and a system for drain can be downsized.

In the second solution, during the dehumidification cooling operation, the air conditioning system is configured to dehumidify, in the adsorption heat exchanger (56, 57), the air having been cooled by the utilization side heat exchanger (55) and then supply the air to the room space. In this case, since the air being dehumidified by the adsorbent of the adsorption heat exchanger (56, 57) has been cooled by the utilization side heat exchanger (55), this enhances the moisture adsorption capacity of the adsorbent. Therefore, the dehumidification performance of the air conditioning system can be enhanced.

Further, during the humidification heating operation, the air conditioning system is configured to humidify, in the adsorption heat exchanger (56, 57), the air having been heated by the utilization side heat exchanger (55) and then supply the air to the room space. In this case, since the air being humidified by the adsorption heat exchanger (56, 57) has been heated by the utilization side heat exchanger (55), this enhances the moisture desorption capacity of the adsorbent. Therefore, the humidification performance of the air conditioning system can be enhanced.

In the third solution, the air conditioning system is configured to allow the air to concurrently flow in parallel flows through the utilization side heat exchanger (55) and the adsorption heat exchanger (56, 57) and then supply the flows of air to the room space. In this case, the pressure loss produced with air flowing is reduced as compared with when the air sequentially flows through, for example, the utilization side heat exchanger (55) and the adsorption heat exchanger (56, 57). This provides reduced power for an air blower for blowing the air and in turn a downsized air blower.

Further, since the utilization side heat exchanger (55) and the adsorption heat exchanger (56, 57) concurrently can cope with the corresponding flows of air, the amount of air flowing through the utilization side heat exchanger (55) and the amount of air flowing through the adsorption heat exchanger (56, 57), for example, can be separately controlled and the air temperature control and air humidity control can be carried out individually. This increases the flexibility of air conditioning using the air conditioning system and thereby enhances the comfortableness of the room space.

In the fourth solution, during the humidification heating operation, the air conditioning system is configured to cool, in the heat-source side heat exchanger (54), the air the moisture in which has been adsorbed by the adsorption heat exchanger (56, 57) and then discharge the air to the outdoor space. In this case, since the air being cooled by the heat-source side heat exchanger (54) has been dehumidified by the adsorption heat exchanger (56, 57), this reduces the amount of condensate produced near the heat-source side heat exchanger (54) with the air cooling. Therefore, drain water can be restrained from being produced in the heat-source side heat exchanger (54) and a system for drain can be downsized. Further, if the heat-source side heat exchanger (54) is disposed in the outdoor space, it can be prevented that condensate freezes on the surface of the heat-source side heat exchanger (54).

In the fifth solution, during the dehumidification cooling operation, the air conditioning system is configured to humidify, in the adsorption heat exchanger (56, 57), the air having been heated by the heat-source side heat exchanger (54) and then discharge the air to the outdoor space. In this case, since the air used to desorb moisture in the adsorbent of the adsorption heat exchanger (56, 57) has been heated by the heat-source side heat exchanger (54), this enhances the moisture desorption capacity of the adsorbent, in other words, the regeneration capacity. Therefore, when the air conditioning system adsorb moisture in the air on the adsorbent of the adsorption heat exchanger (56, 57) and supply the air to the room space, the dehumidification performance can be enhanced.

Further, during the humidification heating operation, the air conditioning system is configured to dehumidify, in the adsorption heat exchanger (56, 57), the air having been cooled by the heat-source side heat exchanger (54) and then discharge the air to the outdoor space. In this case, since the air applying moisture to the adsorbent of the adsorption heat exchanger (56, 57) has been cooled by the heat-source side heat exchanger (54), this enhances the moisture adsorption capacity of the adsorbent. Therefore, when the air conditioning system desorb moisture from the adsorbent of the adsorption heat exchanger (56, 57) and supply the air to the room space, the humidification performance can be enhanced.

In the sixth solution, the air conditioning system is configured to allow the air to concurrently flow in parallel flows through the heat-source side heat exchanger (54) and the adsorption heat exchanger (56, 57) and discharge the flows of air to the outdoor space. In this case, the pressure loss produced with air flowing is reduced as compared with when the air sequentially flows through, for example, the heat-source side heat exchanger (54) and the adsorption heat exchanger (56, 57). This provides reduced power for an air blower for blowing the air and in turn a downsized air blower.

In the seventh solution, the air coped with one of the first and second adsorption heat exchangers (56, 57) is supplied to the room space and, concurrently, the air coped with the other of the first and second adsorption heat exchangers (56, 57) is discharged to the outdoor space. Thus, an adsorption action for one of the first and second adsorption heat exchangers (56, 57) and a regeneration action for the other can concurrently take place. Therefore, the dehumidification cooling operation or the humidification heating operation in the room space can be continuously performed.

BEST MODE FOR CARRYING OUT THE INVENTION

Embodiments of the present invention will be described in detail below with reference to the drawings.

Embodiment 1 of the Invention

Embodiment 1 of the present invention is described. An air conditioning system (10) of the present embodiment runs a vapor compression refrigeration cycle by circulating refrigerant through a refrigerant circuit (40) to cope with both of sensible heat load and latent heat load in a room space. The refrigerant circuit (40) of the air conditioning system (10) is provided with an outdoor heat exchanger (54) as a heat-source side heat exchanger, an indoor heat exchanger (55) as a utilization side heat exchanger and two adsorption heat exchangers (first and second adsorption heat exchangers) (56, 57).

Figure 1:
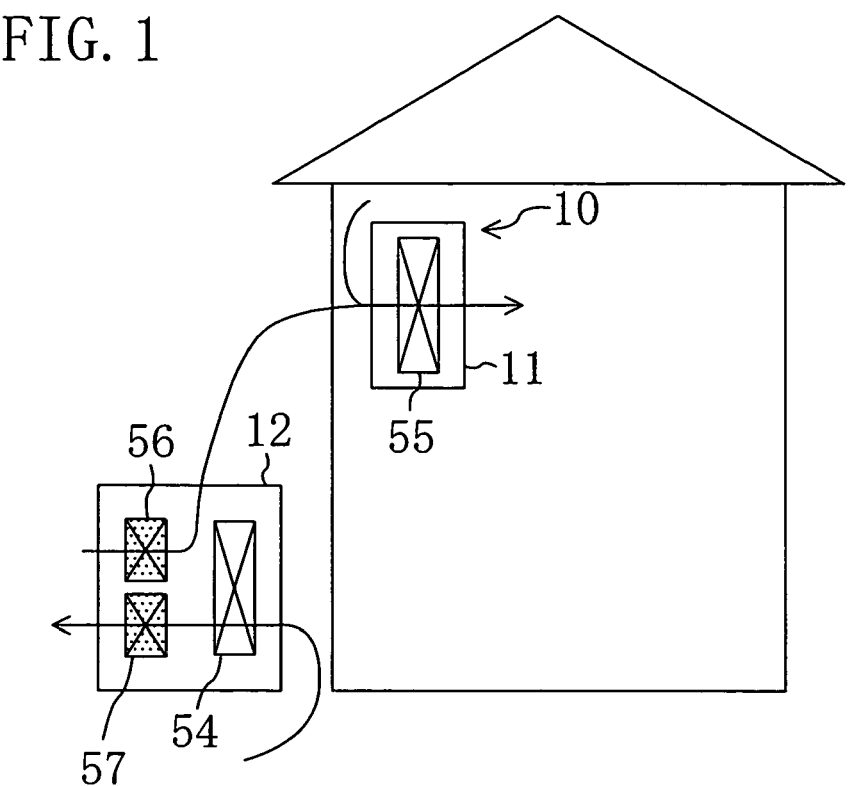
FIG. 1 is a conceptual diagram showing the air flow of an air conditioning system according to Embodiment 1 during a first mode.
Figure 2:
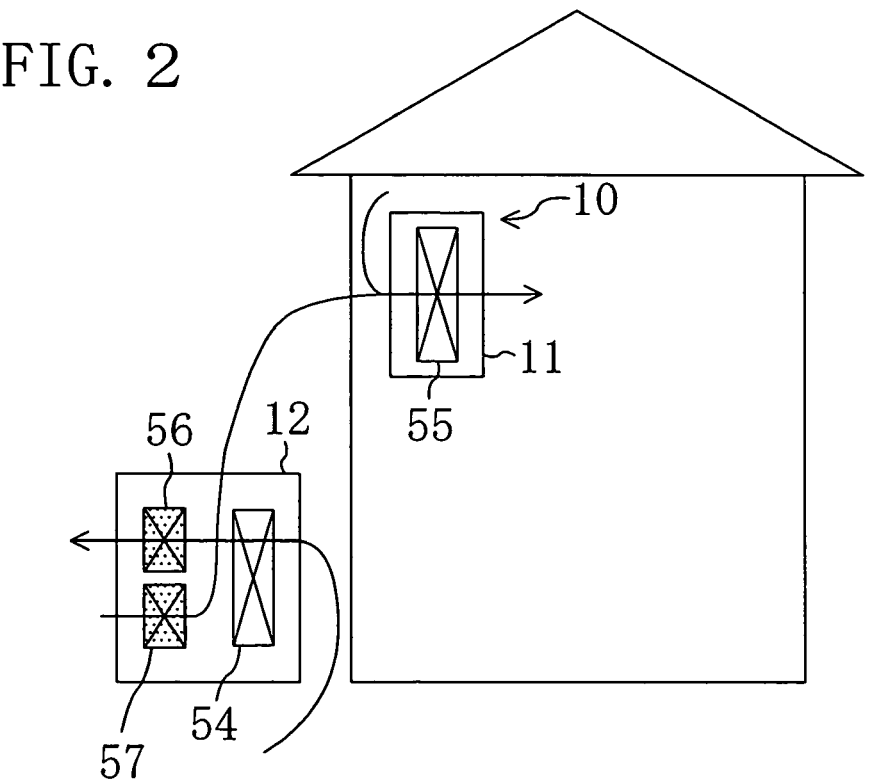
FIG. 2 is a conceptual diagram showing the air flow of the air conditioning system according to Embodiment 1 during a second mode.

As shown in FIGS. 1 and 2, the air conditioning system (10) is configured as a so-called separate type and includes an indoor unit (11) and an outdoor unit (12). The indoor unit (11) includes the indoor heat exchanger (55) and is disposed in the room space. On the other hand, the outdoor unit (12) includes the outdoor heat exchanger (54), the first adsorption heat exchanger (56) and the second adsorption heat exchanger (57) and is disposed in the outdoor space. The indoor unit (11) is configured as a so-called wall-mounted type, namely, is mounted on a wall surface of the room. The indoor unit (11) and the outdoor unit (12) are connected to each other via unshown interconnecting lines of the refrigerant circuit (40). Further, an unshown air passage described later in detail is disposed between the indoor unit (11) and the outdoor unit (12).

As shown in FIGS. 3 and 4, the refrigerant circuit (40) of the air conditioning system (10) is provided with a single compressor (50), a single motor-operated expansion valve (53) and two four-way selector valves (51, 52). Further, the refrigerant circuit (40) is provided with a single outdoor heat exchanger (54), a single indoor heat exchanger (55) and two adsorption heat exchangers (56, 57).

The compressor (50) is connected at its discharge side to the first port of the first four-way selector valve (51) and connected at its suction side to the second port of the first four-way selector valve (51). The outdoor heat exchanger (54) is connected at one end to the third port of the first four-way selector valve (51) and connected at the other end to the first port of the second four-way selector valve (52). The indoor heat exchanger (55) is connected at one end to the fourth port of the first four-way selector valve (51) and connected at the other end to the second port of the second four-way selector valve (52). In the refrigerant circuit (40), the first adsorption heat exchanger (56), the motor-operated expansion valve (53) and the second adsorption heat exchanger (57) are arranged in this order from the third to fourth port of the second four-way selector valve (52).

The outdoor heat exchanger (54), the indoor heat exchanger (55) and each adsorption heat exchanger (56, 57) are cross-fin type fin-and-tube heat exchangers composed of a heat exchanger tube and a large number of fins. Out of them, the adsorption heat exchanger (56, 57) has an adsorbent carried on the fin surfaces. Adsorbents used include zeolite and silica gel. On the other hand, each of the outdoor heat exchanger (54) and the indoor heat exchanger (55) has no adsorbent carried on the fin surfaces and provides only heat exchange between air and refrigerant.

The first four-way selector valve (51) switches between a first position (the position shown in FIG. 3) in which the first and third ports communicate and the second and fourth ports communicate and a second position (the position shown in FIG. 4) in which the first and fourth ports communicate and the second and third ports communicate. On the other hand, the second four-way selector valve (52) switches between a first position (the position shown in FIGS. 3(A) and 4(B)) in which the first and third ports communicate and the second and fourth ports communicate and a second position (the position shown in FIGS. 3(B) and 4(A)) in which the first and fourth ports communicate and the second and third ports communicate.

Under the above structure, as shown in FIGS. 1 and 2, the air conditioning system (10) of Embodiment 1 is configured to supply, through the indoor heat exchanger (55) to the room space, the air having passed through the adsorption heat exchanger (56, 57) disposed in the outdoor unit (12). The air conditioning system (10) is also configured to discharge, through the other adsorption heat exchanger (56, 57) to the outdoor space, the air having passed through the outdoor heat exchanger (54). Further, the air conditioning system (10) is configured to provide so-called batchwise continuous dehumidification and humidification by repeatedly alternating a mode (first mode) in which the air having passed through the first adsorption heat exchanger (56) is supplied to the room space and concurrently the air having passed through the second adsorption heat exchanger (57) is discharged to the outdoor space and a mode (second mode) in which the air having passed through the second adsorption heat exchanger (57) is supplied to the room space and concurrently the air having passed through the first adsorption heat exchanger (56) is discharged to the outdoor space.

—Operational Behavior—

Next, the operational behavior of the air conditioning system (10) of Embodiment 1 is described with reference to FIGS. 1 to 4. The air conditioning system (10) of the present embodiment performs a dehumidification cooling operation and a humidification heating operation. The air conditioning system (10) also provides air conditioning and ventilation of the room space by coping with the outdoor air and supplying it to the room space while coping with part of the room air and circulating it in the room space. When unshown indoor fan and exhaust fan in the air conditioning system (10) are operated, the room air is taken in the indoor unit (11) and the outdoor air is taken in the outdoor unit (12).

<Dehumidification Cooling Operation>

Figure 3A:
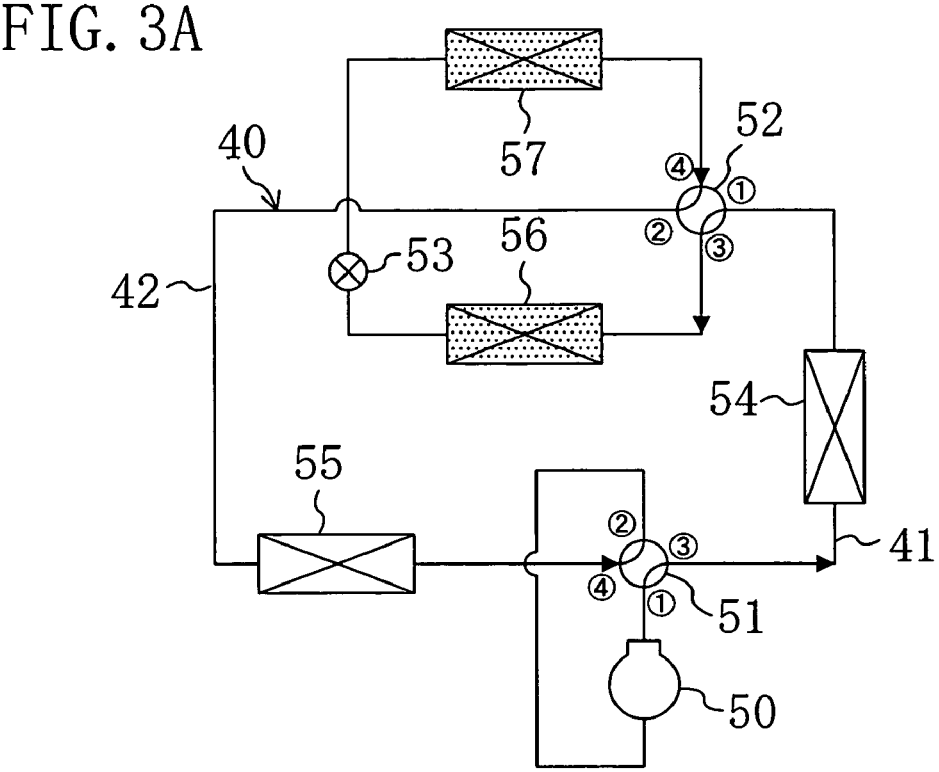
FIG. 3A is a schematic diagram showing the configuration of a refrigerant circuit according to Embodiment 1 and its behavior during the dehumidification cooling operation during a first mode.
Figure 3B:
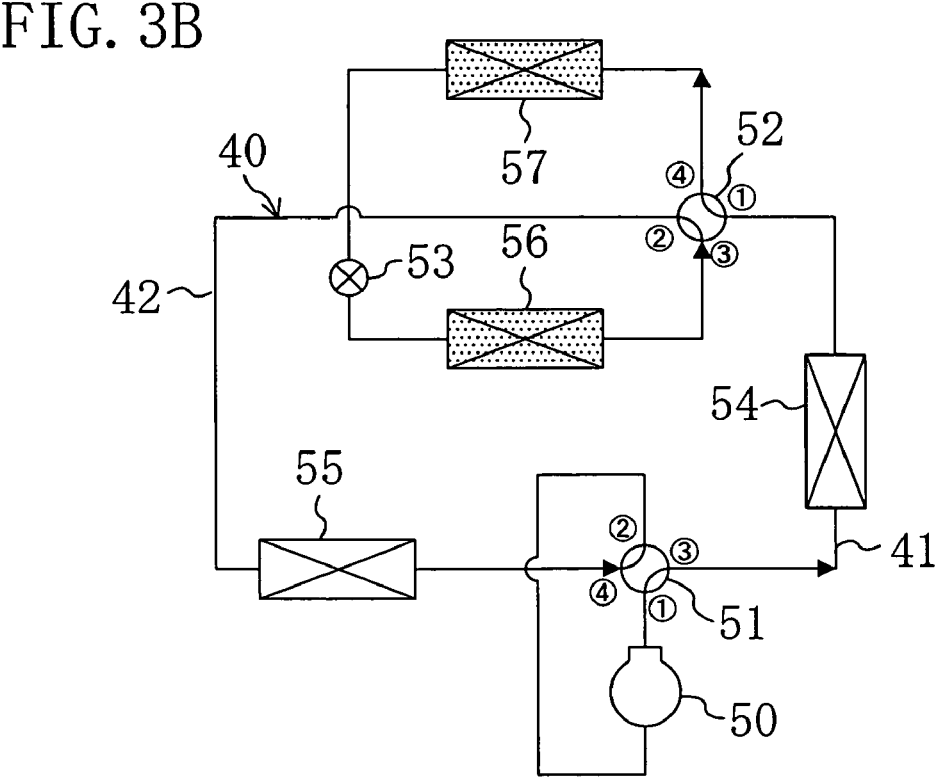
FIG. 3B is a schematic diagram showing the configuration of a refrigerant circuit according to Embodiment 1 and its behavior during the dehumidification cooling operation during a second mode.

During the dehumidification cooling operation, as shown in FIG. 3, in the refrigerant circuit (40), the first four-way selector valve (51) is set to the first position, the opening of the motor-operated expansion valve (53) is appropriately controlled, the outdoor heat exchanger (54) serves as a condenser and the indoor heat exchanger (55) serves as an evaporator. Further, in the air conditioning system (10), the first mode (the mode in FIG. 3(B)) in which the first adsorption heat exchanger (56) serves as an evaporator and the second adsorption heat exchanger (57) serves as a condenser and the second mode (the mode in FIG. 3(A)) in which the second adsorption heat exchanger (57) serves as an evaporator and the first adsorption heat exchanger (56) serves as a condenser are repeatedly alternated.

In the first mode, as shown in FIG. 1, the air taken in the outdoor unit (12) comprises separate flows into the first adsorption heat exchanger (56) and the outdoor heat exchanger (54). The air having flowed into the first adsorption heat exchanger (56) gives heat of evaporation to refrigerant flowing through the first adsorption heat exchanger (56) functioning as an evaporator and thereby being cooled. Further, moisture in the air is adsorbed by the adsorbent carried on the first adsorption heat exchanger (56), so that the air is dehumidified. The air cooled and dehumidified by the first adsorption heat exchanger (56) flows through the unshown air passage disposed between the outdoor unit (12) and the indoor unit (11) and then into the indoor unit (11). The air is mixed with the above-mentioned room air taken in the indoor unit (11) and then flows through the indoor heat exchanger (55). The mixed air gives heat of evaporation to refrigerant flowing through the indoor heat exchanger (55) functioning as an evaporator and thereby being further cooled. The air thus cooled and dehumidified is supplied through the indoor unit (11) to the room space.

On the other hand, out of the air taken in the outdoor unit (12), the air having flowed into the outdoor heat exchanger (54) is given heat of condensation from refrigerant flowing through the outdoor heat exchanger (54) functioning as a condenser and thereby heated. The air heated by the outdoor heat exchanger (54) flows into the second adsorption heat exchanger (57). The air causes moisture in the adsorbent of the second adsorption heat exchanger (57) to be desorbed and the desorbed moisture is given to the air. Thus, the air having generated the second adsorption heat exchanger (57) is discharged through the outdoor unit (12) to the outdoor space.

In the second mode, as shown in FIG. 2, the air taken in the outdoor unit (12) comprises separate flows into the second adsorption heat exchanger (57) and the outdoor heat exchanger (54). The air having flowed into the second adsorption heat exchanger (57) gives heat of evaporation to refrigerant flowing through the second adsorption heat exchanger (57) functioning as an evaporator and thereby being cooled. Further, moisture in the air is adsorbed by the adsorbent carried on the second adsorption heat exchanger (57), so that the air is dehumidified. The air cooled and dehumidified by the second adsorption heat exchanger (57) flows through the unshown air passage disposed between the outdoor unit (12) and the indoor unit (11) and then into the indoor unit (11). The air is mixed with the above-mentioned room air taken in the indoor unit (11) and then flows through the indoor heat exchanger (55). The mixed air gives heat of evaporation to refrigerant flowing through the indoor heat exchanger (55)

functioning as an evaporator and thereby being further cooled. The air thus cooled and dehumidified is supplied through the indoor unit (11) to the room space.

On the other hand, out of the air taken in the outdoor unit (12), the air having flowed into the outdoor heat exchanger (54) is given heat of condensation from refrigerant flowing through the outdoor heat exchanger (54) functioning as a condenser and thereby heated. The air heated by the outdoor heat exchanger (54) flows into the first adsorption heat exchanger (56). The air causes moisture in the adsorbent of the first adsorption heat exchanger (56) to be desorbed and the desorbed moisture is given to the air. Thus, the air having generated the first adsorption heat exchanger (56) is discharged through the outdoor unit (12) to the outdoor space.

<Humidification Heating Operation>

Figure 4A:
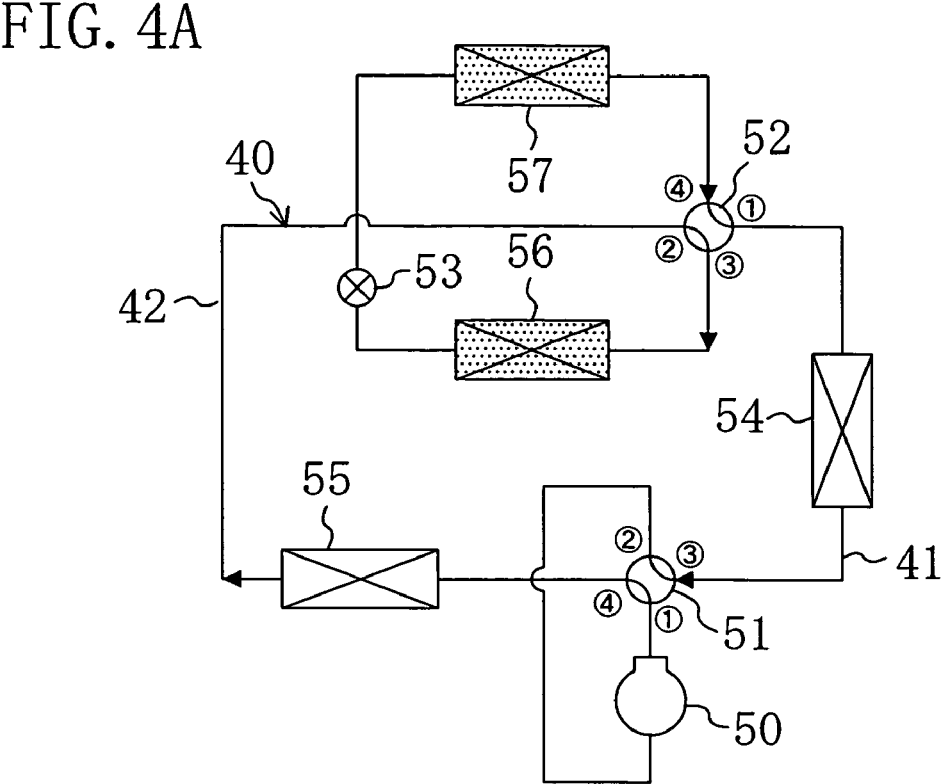
FIG. 4A is a schematic diagram showing the configuration of the refrigerant circuit according to Embodiment 1 and its behavior during the humidification heating operation during a first mode.
Figure 4B:
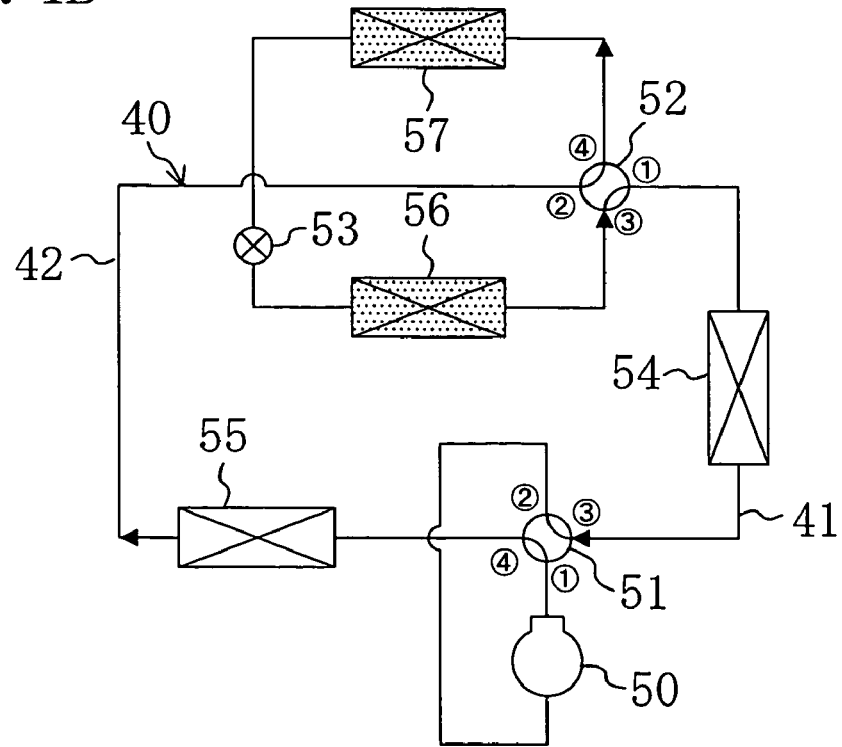
FIG. 4B is a schematic diagram showing the configuration of the refrigerant circuit according to Embodiment 1 and its behavior during the humidification heating operation during a second mode.

During the humidification heating operation, as shown in FIG. 4, in the refrigerant circuit (40), the first four-way selector valve (51) is set to the second position, the opening of the motor-operated expansion valve (53) is appropriately controlled, the indoor heat exchanger (55) serves as a condenser and the outdoor heat exchanger (54) serves as an evaporator. Further, a first mode (the mode in FIG. 4(A)) in which the first adsorption heat exchanger (56) serves as a condenser and the second adsorption heat exchanger (57) serves as an evaporator and a second mode (the mode in FIG. 4(B)) in which the second adsorption heat exchanger (57) serves as a condenser and the first adsorption heat exchanger (56) serves as an evaporator are repeatedly alternated.

In the first mode, as shown in FIG. 1, the air taken in the outdoor unit (12) comprises separate flows into the first adsorption heat exchanger (56) and the outdoor heat exchanger (54). The air having flowed into the first adsorption heat exchanger (56) is given heat of condensation from refrigerant flowing through the first adsorption heat exchanger (56) functioning as a condenser and thereby heated. Further, the air is given moisture desorbed from the adsorbent of the first adsorption heat exchanger (56) and thereby humidified. The air heated and humidified by the first adsorption heat exchanger (56) flows through the unshown air passage disposed between the outdoor unit (12) and the indoor unit (11) and then into the indoor unit (11). The air is mixed with the above-mentioned room air taken in the indoor unit (11) and then flows through the indoor heat exchanger (55). The mixed air is given heat of condensation from refrigerant flowing through the indoor heat exchanger (55) functioning as a condenser and thereby further heated. The air thus heated and humidified is supplied through the indoor unit (11) to the room space.

On the other hand, out of the air taken in the outdoor unit (12), the air having flowed into the outdoor heat exchanger (54) gives heat of evaporation to refrigerant flowing through the outdoor heat exchanger (54) functioning as an evaporator and thereby being cooled. The air cooled by the outdoor heat exchanger (54) flows into the second adsorption heat exchanger (57). The moisture in the air is adsorbed by the adsorbent of the second adsorption heat exchanger (57). Thus, the air having given moisture to the second adsorption heat exchanger (57) is discharged through the outdoor unit (12) to the outdoor space.

In the second mode, as shown in FIG. 2, the air taken in the outdoor unit (12) comprises separate flows into the second adsorption heat exchanger (57) and the outdoor heat exchanger (54). The air having flowed into the second adsorption heat exchanger (57) is given heat of condensation from refrigerant flowing through the second adsorption heat exchanger (57) functioning as a condenser and thereby heated. Further, the air is given moisture desorbed from the adsorbent of the second adsorption heat exchanger (57) and thereby humidified. The air heated and humidified by the second adsorption heat exchanger (56) flows through the unshown air passage disposed between the outdoor unit (12) and the indoor unit (11) and then into the indoor unit (11). The air is mixed with the above-mentioned room air taken in the indoor unit (11) and then flows through the indoor heat exchanger (55). The mixed air is given heat of condensation from refrigerant flowing through the indoor heat exchanger (55) functioning as a condenser and thereby further heated. The air thus heated and humidified is supplied through the indoor unit (11) to the room space.

On the other hand, out of the air taken in the outdoor unit (12), the air having flowed into the outdoor heat exchanger (54) gives heat of evaporation to refrigerant flowing through the outdoor heat exchanger (54) functioning as an evaporator and thereby being cooled. The air cooled by the outdoor heat exchanger (54) flows into the first adsorption heat exchanger (56). The moisture in the air is adsorbed by the adsorbent of the first adsorption heat exchanger (56). Thus, the air having given moisture to the first adsorption heat exchanger (56) is discharged through the outdoor unit (12) to the outdoor space.

—Effects of Embodiment 1—

In Embodiment 1, the adsorption heat exchangers (56, 57) are disposed in the refrigerant circuit (40) and the air humidity is controlled by passing the air through the adsorption heat exchangers (56, 57). In other words, the air is dehumidified not by condensing moisture in the air as in the known technique but by adsorbing the moisture in the air on an adsorbent. This eliminates the need to set the refrigerant evaporation temperature in the refrigeration cycle below the dew point of air and enables air dehumidification even if the refrigerant evaporation temperature is set at the air dew point or higher.

Therefore, according to the present embodiment, in dehumidifying air, the refrigerant evaporation temperature in the refrigeration cycle can be set higher than conventionally done, which reduces the difference between high and low pressures in the refrigeration cycle. As a result, the power consumption of the compressor (50) can be reduced, thereby improving the COP of the refrigeration cycle.

Further, Embodiment 1 is configured so that the air having passed through the first or second heat exchanger (56, 57) flows through the indoor heat exchanger (55) and is then supplied through the indoor unit (11) to the room space. Thus, during the dehumidification cooling operation, the humidity of the air to be cooled by the indoor heat exchanger (55) can be lowered by the adsorption action of the first or second adsorption heat exchanger (56, 57). Therefore, the amount of condensate produced during air cooling of the indoor heat exchanger (55) can be reduced. As a result, a drain recovery system or the like disposed near the indoor heat exchanger (55) can be downsized.

Furthermore, Embodiment 1 is configured so that the air having passed through the first or second adsorption heat exchanger (56, 57) is first mixed with the room air and the mixed air then flows through the indoor heat exchanger (55). The air flowing through the indoor heat exchanger (55), however, may be only the outdoor air having passed through the first or second adsorption heat exchanger (56, 57). Also in this case, owing to the above reason, the amount of condensate produced during air cooling of the indoor heat exchanger (55) can be reduced.

Furthermore, Embodiment 1 is configured so that the air having passed through the outdoor heat exchanger (54) flows through the first or second adsorption heat exchanger (56, 57) and is then discharged through the outdoor unit (12) to the outdoor space. Therefore, during the dehumidification cooling operation, the air flowing through the first or second adsorption heat exchanger (56, 57) has a higher temperature than when not heated by the outdoor heat exchanger (54). This enhances the moisture desorption capacities of the adsorbents of the first and second adsorption heat exchangers (56, 57) and increases the regeneration efficiencies of the adsorbents. Thus, when the moisture in the air supplied to the room space during the dehumidification is adsorbed by the adsorbent of the first or second adsorption heat exchanger (56, 57), the adsorption capacity of the adsorbent is also enhanced. As a result, the dehumidification performance of the air conditioning system (10) is enhanced.

On the other hand, during the humidification heating operation, the air flowing through the first or second adsorption heat exchanger (56, 57) has a lower temperature than when not cooled by the outdoor heat exchanger (54). This enhances the moisture adsorption capacities of the adsorbents of the first and second adsorption heat exchangers (56, 57) and increases the amounts of moisture given to the adsorbents. This in turn increases the amounts of moisture given from the adsorbents to the air supplied to the room space during the humidification. As a result, the humidification performance of the air conditioning system (10) is enhanced.

Furthermore, in the present embodiment, the adsorption heat exchanger comprises the first adsorption heat exchanger (56) and the second adsorption heat exchanger (57). Therefore, the first mode and the second mode are repeatedly alternated, which enables a continuous dehumidification cooling operation and a continuous humidification heating operation.

—Modification of Embodiment 1—

As described above, Embodiment 1 is configured so that the air having passed through the outdoor heat exchanger (54) flows through the first or second adsorption heat exchanger (56, 57) and is then discharged through the outdoor unit (12) to the outdoor space.

Figure 5:
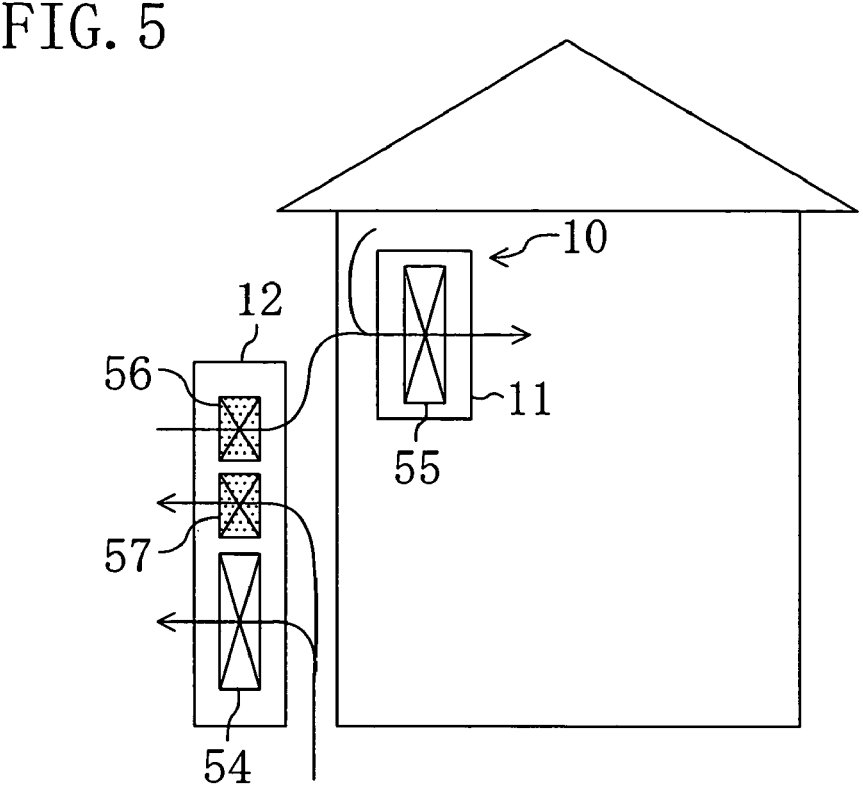
FIG. 5 is a conceptual diagram showing the air flow of an air conditioning system according to a modification of Embodiment 1 during a first mode.
Figure 6:
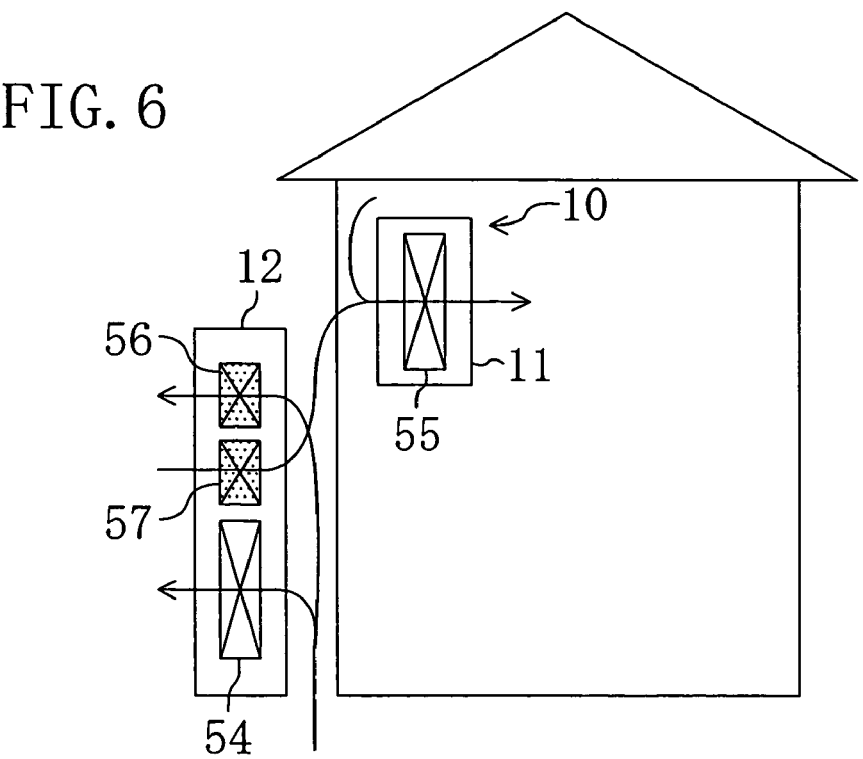
FIG. 6 is a conceptual diagram showing the air flow of the air conditioning system according to the modification of Embodiment 1 during a second mode.

Unlike the above embodiment, the air conditioning system (10) of this modification is configured so that in discharging the air through the outdoor unit (12) to the outdoor space, the outdoor heat exchanger (54) and the adsorption heat exchanger (56, 57) concurrently pass the parallel flows of air, respectively, to concurrently cope with the flow of air passing through the outdoor heat exchanger (54) and the flow of air passing through the adsorption heat exchanger (56, 57) and the flows of air are then discharged to the outdoor space (see FIGS. 5 and 6). In this modification, the rest of the configuration of the air conditioning system (10) is the same as in Embodiment 1.

—Operational Behavior—

The operational behavior of the air conditioning system (10) of this modification is described with reference to FIGS. 3 to 6. The air conditioning system (10) of the present embodiment performs a dehumidification cooling operation and a humidification heating operation. The air conditioning system (10) also provides air conditioning and ventilation of the room space by coping with the outdoor air and supplying it to the room space while coping with part of the room air and circulating it in the room space. When unshown indoor fan and exhaust fan in the air conditioning system (10) are operated, the room air is taken in the indoor unit (11) and the outdoor air is taken in the outdoor unit (12).

<Dehumidification Cooling Operation>

During the dehumidification cooling operation, the refrigerant circuit (40) is put into the state as shown in FIG. 3. Further, in the air conditioning system (10), a first mode in which the refrigerant circuit (40) is put into the state shown in FIG. 3(B) and a second mode in which the refrigerant circuit (40) is put into the state shown in FIG. 3(A) are repeatedly alternated.

In the first mode, as shown in FIG. 5, the air taken in the outdoor unit (12) comprises separate flows into the first adsorption heat exchanger (56), the outdoor heat exchanger (54) and the second adsorption heat exchanger (57).

The air having flowed into the first adsorption heat exchanger (56) gives heat of evaporation to refrigerant flowing through the first adsorption heat exchanger (56) functioning as an evaporator and thereby being cooled. Further, moisture in the air is adsorbed by the adsorbent carried on the first adsorption heat exchanger (56), so that the air is dehumidified. The air cooled and dehumidified by the first adsorption heat exchanger (56) flows through the unshown air passage disposed between the outdoor unit (12) and the indoor unit (11) and then into the indoor unit (11). The air is mixed with the above-mentioned room air taken in the indoor unit (11) and then flows through the indoor heat exchanger (55). The mixed air gives heat of evaporation to refrigerant flowing through the indoor heat exchanger (55) functioning as an evaporator and thereby being further cooled. The air thus cooled and dehumidified is supplied through the indoor unit (11) to the room space.

On the other hand, out of the air taken in the outdoor unit (12), the air having flowed into the outdoor heat exchanger (54) is given heat of condensation from refrigerant flowing through the outdoor heat exchanger (54) functioning as a condenser and thereby heated. The air heated by the outdoor heat exchanger (54) is discharged through the indoor unit (12) to the outdoor space. Out of the air taken in the outdoor unit (12), the air having flowed into the second adsorption heat exchanger (57) causes moisture in the adsorbent of the second adsorption heat exchanger (57) to be desorbed and the desorbed moisture is given to the air. Thus, the air having generated the second adsorption heat exchanger (57) is discharged through the outdoor unit (12) to the outdoor space.

On the contrary to the first mode, in the second mode, as shown in FIG. 6, air dehumidification is implemented by the second adsorption heat exchanger (57) and the adsorbent of the first adsorption heat exchanger (56) is regenerated by the air. The rest of the behavior is the same as in the first mode described above.

<Humidification Heating Operation>

During the humidification heating operation, the refrigerant circuit (40) is put into the state as shown in FIG. 4. Further, in the air conditioning system (10), a first mode in which the refrigerant circuit (40) is put into the state shown in FIG. 4(A) and a second mode in which the refrigerant circuit (40) is put into the state shown in FIG. 4(B) are repeatedly alternated.

In the first mode, as shown in FIG. 5, the air taken in the outdoor unit (12) comprises separate flows into the first adsorption heat exchanger (56), the outdoor heat exchanger (54) and the second adsorption heat exchanger (57). The air having flowed into the first adsorption heat exchanger (56) is given heat of condensation from refrigerant flowing through the first adsorption heat exchanger (56) functioning as a condenser and thereby heated. Further, the air is given moisture desorbed from the adsorbent of the first adsorption heat exchanger (56) and thereby humidified. The air heated and humidified by the first adsorption heat exchanger (56) flows through the unshown air passage disposed between the outdoor unit (12) and the indoor unit (11) and then into the indoor unit (11). The air is mixed with the above-mentioned room air taken in the indoor unit (11) and then flows through the indoor heat exchanger (55). The mixed air is given heat of condensation from refrigerant flowing through the indoor heat exchanger (55) functioning as a condenser and thereby further heated. The air thus heated and humidified is supplied through the indoor unit (11) to the room space.

On the other hand, out of the air taken in the outdoor unit (12), the air having flowed into the outdoor heat exchanger (54) gives heat of evaporation to refrigerant flowing through the outdoor heat exchanger (54) functioning as an evaporator and thereby being cooled. The air cooled by the outdoor heat exchanger (54) is discharged through the indoor unit (12) to the outdoor space. Out of the air taken in the outdoor unit (12), the air having flowed into the second adsorption heat exchanger (57) causes its moisture to be adsorbed on the adsorbent of the second adsorption heat exchanger (57). Thus, the air having given moisture to the adsorbent of the second adsorption heat exchanger (57) is discharged through the outdoor unit (12) to the outdoor space.

On the contrary to the first mode, in the second mode, as shown in FIG. 6, air humidification is implemented by the second adsorption heat exchanger (57) and moisture in the air is given to the adsorbent of the first adsorption heat exchanger (56). The rest of the behavior is the same as in the first mode described above.

In the air conditioning system (10) of this modification, the flow of air through the outdoor heat exchanger (54) and the flow of air through the adsorption heat exchanger (56, 57) concurrently pass in parallel in the outdoor unit (12) and are then discharged to the outdoor space. In this case, the pressure loss produced with air flowing is reduced as compared with when the air sequentially flows through, for example, the adsorption heat exchanger and the outdoor heat exchanger. This provides reduced power for the outdoor fan and in turn reduced running cost. Further, the outdoor fan can be downsized.

Embodiment 2 of the Invention

Figure 7:
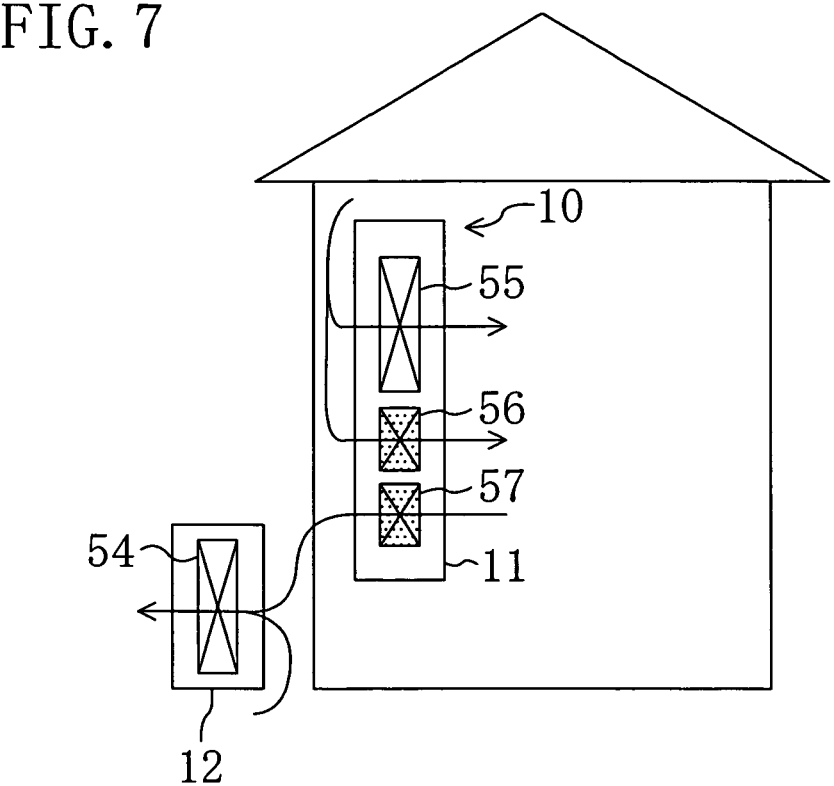
FIG. 7 is a conceptual diagram showing the air flow of an air conditioning system according to Embodiment 2 during a first mode.
Figure 8:
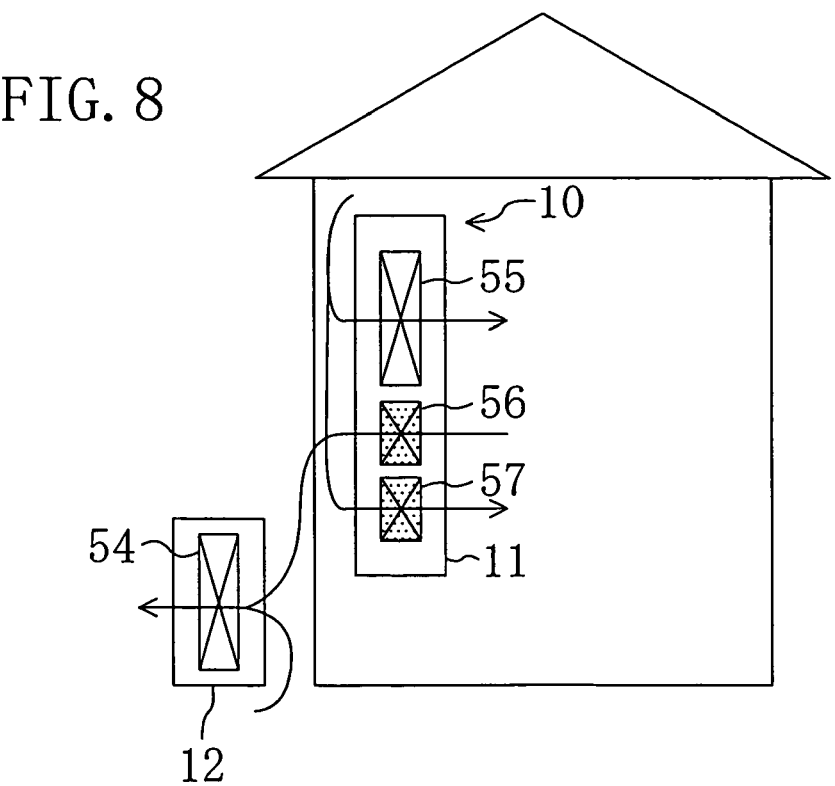
FIG. 8 is a conceptual diagram showing the air flow of the air conditioning system according to Embodiment 2 during a second mode.

Next, Embodiment 2 of the present invention is described. As shown in FIGS. 7 and 8, the air conditioning system (10) of Embodiment 2 is configured, like Embodiment 1, as a so-called separate type and includes an indoor unit (11) and an outdoor unit (12). A refrigerant circuit (40) of the air conditioning system (10) is provided with an outdoor heat exchanger (54), an indoor heat exchanger (55) and first and second adsorption heat exchangers (56, 57).

The indoor unit (11) includes an indoor heat exchanger (55), the first adsorption heat exchanger (56) and the second adsorption heat exchanger (57) and is disposed in the room space. On the other hand, the outdoor unit (12) includes the outdoor heat exchanger (54) and is disposed in the outdoor space.

As shown in FIGS. 7 and 8, the air conditioning system (10) of Embodiment 2 is configured to allow the air to concurrently flow in parallel flows through the indoor heat exchanger (55) and the adsorption heat exchanger (56, 57) both disposed in the indoor unit (12) and supply to the room space the flow of air having passed through the indoor heat exchanger (55) and the flow of air having passed through the adsorption heat exchanger (56, 57). The air conditioning system (10) is also configured to discharge the air having passed through the other adsorption heat exchanger (56, 57) to the outdoor space through the outdoor heat exchanger (54). The rest of the configuration of Embodiment 2 is the same as in Embodiment 1.

—Operational Behavior—

The operational behavior of the air conditioning system (10) of Embodiment 2 is described with reference to FIGS. 3, 4, 7 and 8. The air conditioning system (10) of the present embodiment performs a dehumidification cooling operation and a humidification heating operation. The air conditioning system (10) also provides air conditioning and ventilation of the room space by coping with the room air and returning it to the room space while discharging part of the room air to the outdoor space. When unshown indoor fan and exhaust fan in the air conditioning system (10) are operated, the room air is taken in the indoor unit (11) and the outdoor air is taken in the outdoor unit (12).

<Dehumidification Cooling Operation>

During the dehumidification cooling operation, the refrigerant circuit (40) is put into the state shown in FIG. 3. Further, in the air conditioning system (10), a first mode in which the refrigerant circuit (40) is put into the state shown in FIG. 3(B) and a second mode in which the refrigerant circuit (40) is put into the state shown in FIG. 3(A) are repeatedly alternated.

In the first mode, as shown in FIG. 7, the air taken in the indoor unit (11) comprises separate flows into the first adsorption heat exchanger (56), the indoor heat exchanger (55) and the second adsorption heat exchanger (57).

The air having flowed into the first adsorption heat exchanger (56) gives heat of evaporation to refrigerant flowing through the first adsorption heat exchanger (56) functioning as an evaporator and thereby being cooled. Further, moisture in the air is adsorbed by the adsorbent of the first adsorption heat exchanger (56), so that the air is dehumidified. The air cooled and dehumidified by the first adsorption heat exchanger (56) is supplied through the indoor unit (11) to the room space.

The air having flowed into the indoor heat exchanger (55) gives heat of evaporation to refrigerant flowing through the indoor heat exchanger (55) functioning as an evaporator and thereby being cooled. The air cooled by the indoor heat exchanger (55) is supplied through the indoor unit (11) to the room space.

On the other hand, out of the air taken in the indoor unit (11), the air having flowed into the second adsorption heat exchanger (57) causes moisture in the adsorbent of the second adsorption heat exchanger (57) to be desorbed and the desorbed moisture is given to the air. Thus, the air having generated the second adsorption heat exchanger (57) flows through the unshown air passage disposed between the outdoor unit (12) and the indoor unit (11) and then into the outdoor unit (12). The air is mixed with the above-mentioned outdoor air taken in the outdoor unit (12) and then flows through the outdoor heat exchanger (54). The mixed air is given heat of condensation from refrigerant flowing through the outdoor heat exchanger (54) functioning as a condenser and thereby heated. Then, the air is discharged through the outdoor unit (12) to the outdoor space.

On the contrary to the first mode, in the second mode, as shown in FIG. 8, air dehumidification is implemented by the second adsorption heat exchanger (57) and the adsorbent of the first adsorption heat exchanger (56) is regenerated by the air. The rest of the behavior is the same as in the first mode described above.

<Humidification Heating Operation>

During the humidification heating operation, the refrigerant circuit (40) is put into the state as shown in FIG. 4. Further, in the air conditioning system (10), a first mode in which the refrigerant circuit (40) is put into the state shown in FIG. 4(A) and a second mode in which the refrigerant circuit (40) is put into the state shown in FIG. 4(B) are repeatedly alternated.

In the first mode, as shown in FIG. 7, the air taken in the indoor unit (11) comprises separate flows into the first adsorption heat exchanger (56), the indoor heat exchanger (55) and the second adsorption heat exchanger (57).

The air having flowed into the first adsorption heat exchanger (56) is given heat of condensation from refrigerant flowing through the first adsorption heat exchanger (56) functioning as a condenser and thereby heated. Further, the air is given moisture desorbed from the adsorbent of the first adsorption heat exchanger (56) and thereby humidified. The air heated and humidified by the first adsorption heat exchanger (56) is supplied through the indoor unit (11) to the room space.

The air having flowed into the indoor heat exchanger (55) is given heat of condensation from refrigerant flowing through the indoor heat exchanger (55) functioning as a condenser and thereby heated. The air heated by the indoor heat exchanger (55) is supplied through the indoor unit (11) to the room space.

On the other hand, out of the air taken in the indoor unit (11), the air having flowed into the second adsorption heat exchanger (57) gives moisture to the adsorbent of the second adsorption heat exchanger (57). Then, the air flows through the unshown air passage disposed between the indoor unit (11) and the outdoor unit (12) and then into the outdoor unit (12). The air is mixed with the above-mentioned outdoor air taken in the outdoor unit (12) and then flows through the outdoor heat exchanger (54). The mixed air gives heat of evaporation to refrigerant flowing through the outdoor heat exchanger (54) functioning as an evaporator and thereby being cooled. Then, the air is discharged through the outdoor unit (12) to the outdoor space.

On the contrary to the first mode, in the second mode, as shown in FIG. 8, air humidification is implemented by the second adsorption heat exchanger (57) and moisture in the air is given to the adsorbent of the first adsorption heat exchanger (56). The rest of the behavior is the same as in the first mode described above.

—Effects of Embodiment 2—

In Embodiment 2, like Embodiment 1, the adsorption heat exchangers (56, 57) are disposed in the refrigerant circuit (40) and the air humidity is controlled by passing the air through the adsorption heat exchangers (56, 57). Therefore, in dehumidifying air, the refrigerant evaporation temperature in the refrigeration cycle can be set higher than conventionally done, which reduces the difference between high and low pressures in the refrigeration cycle. As a result, the power consumption of the compressor (50) can be reduced, thereby improving the COP of the refrigeration cycle. Further, Embodiment 2 is configured to allow the air to concurrently flow in parallel flows through the indoor heat exchanger (55) and the adsorption heat exchanger (56, 57), respectively, and to supply to the room space the flows of air individually coped with by the indoor heat exchanger (55) and the adsorption heat exchanger (56, 57). In this case, the pressure loss produced with air flowing is reduced as compared with when the air sequentially flows through, for example, the adsorption heat exchanger and the indoor heat exchanger. This provides reduced power for the outdoor fan and in turn downsizes the outdoor fan. Furthermore, the flows of air to be supplied to the room space can be coped with by the indoor heat exchanger (55) and the adsorption heat exchanger (56, 57) individually. Therefore, for example, if the amount of air flowing through the indoor heat exchanger (55) and the amount of air flowing through the adsorption heat exchanger (56, 57) are separately controlled, the temperature control and humidity control of the room space can be carried out individually. This increases the flexibility of air conditioning using the air conditioning system (11) and thereby enhances the comfortableness of the room space.

Furthermore, Embodiment 2 is configured so that the air having passed through the first or second heat exchanger (56, 57) flows through the outdoor heat exchanger (54) and is then discharged through the outdoor unit (12) to the outdoor space. Thus, during the humidification heating operation, the humidity of the air to be cooled by the outdoor heat exchanger (54) can be lowered by the adsorption action of the first or second adsorption heat exchanger (56, 57). Therefore, the amount of condensate produced during air cooling of the outdoor heat exchanger (54) can be reduced. As a result, a drain recovery system or the like disposed near the outdoor heat exchanger (54) can be downsized. In addition, the freezing of condensate can be prevented, which eliminates the need for a system against freezing or downsizes the system. Therefore, the air conditioning system can have a compact design.

Embodiment 2 is configured so that the air having passed through the first or second adsorption heat exchanger (56, 57) is first mixed with the outdoor air and the mixed air then flows through the outdoor heat exchanger (54). The air flowing through the outdoor heat exchanger (54), however, may be only the room air having passed through the first or second adsorption heat exchanger (56, 57). Also in this case, owing to the above reason, the amount of condensate produced during air cooling of the outdoor heat exchanger (54) can be reduced.

—Modification of Embodiment 2—

Figure 9:
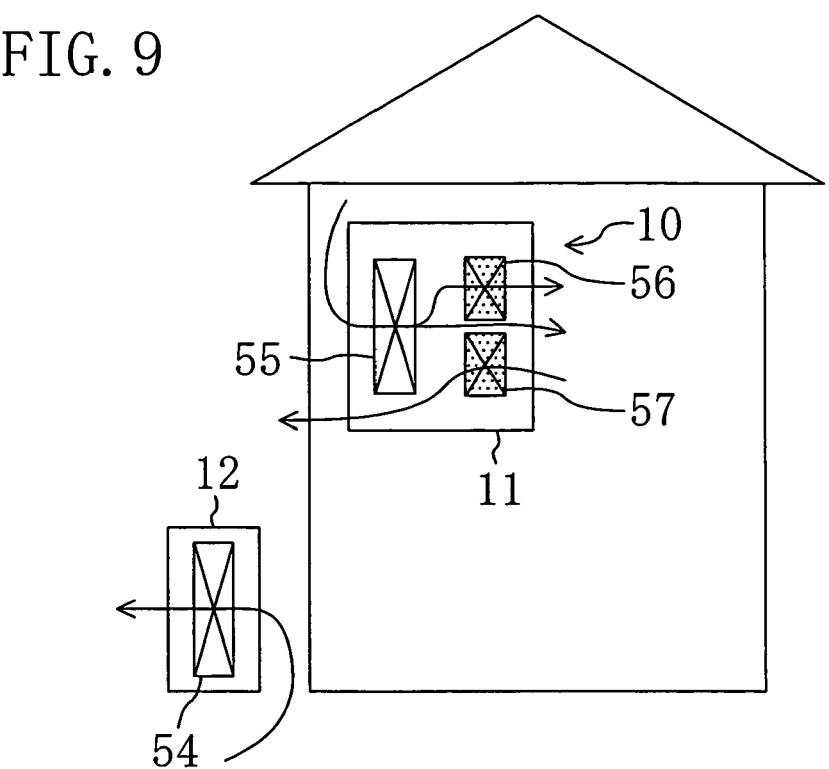
FIG. 9 is a conceptual diagram showing the air flow of an air conditioning system according to a modification of Embodiment 2 during a first mode.
Figure 10:
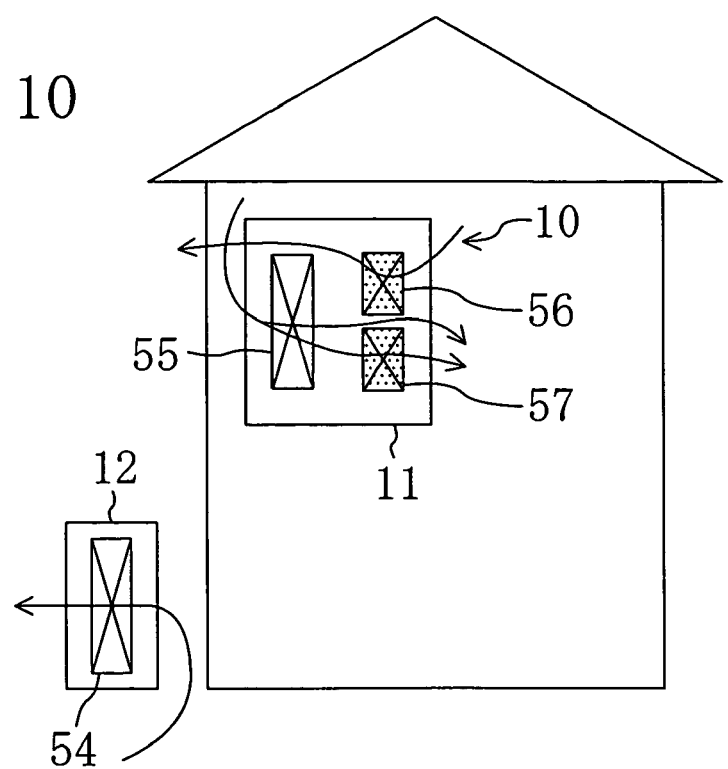
FIG. 10 is a conceptual diagram showing the air flow of the air conditioning system according to the modification of Embodiment 2 during a second mode.

This modification varies in the air flow to be coped with from the air conditioning system (10) of Embodiment 2. As shown in FIGS. 9 and 10, the air conditioning system (10) of the modification is configured so that in supplying the air through the indoor unit (11) to the room space, the air having passed through the indoor heat exchanger (55) is supplied through the first or second adsorption heat exchanger (56, 57) to the room space. Further, the air conditioning system (10) includes no air passage disposed between the indoor unit (11) and the outdoor unit (12) as described in Embodiment 2 but the indoor unit (11) is provided with an unshown exhaust passage for discharging the air coped with to the outdoor space. The rest of the configuration of the air conditioning system (10) of this modification is the same as in Embodiment 2.

—Operational Behavior—

The operational behavior of the air conditioning system (10) of this modification is described with reference to FIGS. 3, 4, 9 and 10. The air conditioning system (10) of the present embodiment performs a dehumidification cooling operation and a humidification heating operation. The air conditioning system (10) also provides air conditioning and ventilation of the room space by coping with the room air and returning it to the room space while discharging part of the room air to the outdoor space. When unshown indoor fan and exhaust fan in the air conditioning system (10) are operated, the room air is taken in the indoor unit (11) and the outdoor air is taken in the outdoor unit (12).

<Dehumidification Cooling Operation>

During the dehumidification cooling operation, the refrigerant circuit (40) is put into the state shown in FIG. 3. Further, in the air conditioning system (10), a first mode in which the refrigerant circuit (40) is put into the state shown in FIG. 3(B) and a second mode in which the refrigerant circuit (40) is put into the state shown in FIG. 3(A) are repeatedly alternated.

In the first mode, as shown in FIG. 9, the air taken in the indoor unit (11) comprises separate flows into the indoor heat exchanger (55) and the second adsorption heat exchanger (57).

The air having flowed into the indoor heat exchanger (55) is cooled by the indoor heat exchanger (55) serving as an evaporator. Part of the air flows through the first adsorption heat exchanger (56), while the rest is supplied through the indoor unit (11) to the room space. The air flowing through the first adsorption heat exchanger (56) is cooled by the first adsorption heat exchanger (56) serving as an evaporator. Further, moisture in the air is adsorbed by the adsorbent of the first adsorption heat exchanger (56), so that the air is dehumidified. The air thus cooled and dehumidified is supplied through the indoor unit (11) to the room space.

Out of the air taken in the indoor unit (10), the air having flowed into the second adsorption heat exchanger (57) causes moisture in the adsorbent of the second adsorption heat exchanger (57) to be desorbed and the desorbed moisture is given to the air. Thus, the air having generated the second adsorption heat exchanger (57) is discharged through the above-mentioned exhaust passage to the outdoor space.

On the contrary to the first mode, in the second mode, as shown in FIG. 10, air dehumidification is implemented by the second adsorption heat exchanger (57) and the adsorbent of the first adsorption heat exchanger (56) is regenerated by the air. The rest of the behavior is the same as in the first mode described above.

<Humidification Heating Operation>

During the humidification heating operation, the refrigerant circuit (40) is put into the state as shown in FIG. 4. Further, in the air conditioning system (10), a first mode in which the refrigerant circuit (40) is put into the state shown in FIG. 4(A) and a second mode in which the refrigerant circuit (40) is put into the state shown in FIG. 4(B) are repeatedly alternated.

In the first mode, as shown in FIG. 9, the air taken in the indoor unit (11) comprises separate flows into the indoor heat exchanger (55) and the second adsorption heat exchanger (57).

The air having flowed into the indoor heat exchanger (55) is heated by the indoor heat exchanger (55) serving as a condenser. Part of the air flows through the first adsorption heat exchanger (56), while the rest is supplied through the indoor unit (11) to the room space. The air flowing through the first adsorption heat exchanger (56) is humidified by taking moisture desorbed from the adsorbent of the first adsorption heat exchanger (56). The air thus heated and humidified is supplied through the indoor unit (11) to the room space.

Out of the air taken in the indoor unit (10), the air having flowed into the second adsorption heat exchanger (57) gives moisture to the adsorbent of the second adsorption heat exchanger (57). Then, the air is discharged through the above-mentioned exhaust passage to the outdoor space.

On the contrary to the first mode, in the second mode, as shown in FIG. 10, air humidification is implemented by the second adsorption heat exchanger (57) and moisture in the air is given to the adsorbent of the first adsorption heat exchanger (56). The rest of the behavior is the same as in the first mode described above.

This modification is configured so that the air having passed through the indoor heat exchanger (55) flows through the first or second adsorption heat exchanger (56, 57) and is then supplied through the indoor unit (11) to the room space. Therefore, during the dehumidification cooling operation, the air flowing through the first or second adsorption heat exchanger (56, 57) has a lower temperature than when not cooled by the indoor heat exchanger (55). This enhances the moisture adsorption capacities of the adsorbents of the first and second adsorption heat exchangers (56, 57). As a result, the dehumidification performance of the air conditioning system (10) is enhanced.

On the other hand, during the humidification heating operation, the air flowing through the first or second adsorption heat exchanger (56, 57) has a higher temperature than when not heated by the indoor heat exchanger (55). This enhances the moisture desorption capacities of the adsorbents of the first and second adsorption heat exchangers (56, 57). As a result, the humidification performance of the air conditioning system (10) is enhanced.

Though this modification is configured so that part of the air having passed through the indoor heat exchanger (55) flows through the first or second adsorption heat exchanger (56, 57), the air conditioning system may be configured so that the whole air having passed through the indoor heat exchanger (55) flows through the first or second adsorption heat exchanger (56, 57). Also in this case, the dehumidification and humidification performances can be enhanced owing to the above reason.

Embodiment 3 of the Invention

Next, an air conditioning system (10) of Embodiment 3 of the present invention is described with reference to several drawings. A refrigerant circuit (40) of the air conditioning system (10) is provided with an outdoor heat exchanger (54), an indoor heat exchanger (55) and first and second adsorption heat exchangers (56, 57). The rest of the configuration of the refrigerant circuit (40) is the same as in the above Embodiments 1 and 2 as shown in FIGS. 3 and 4.

Figure 11:
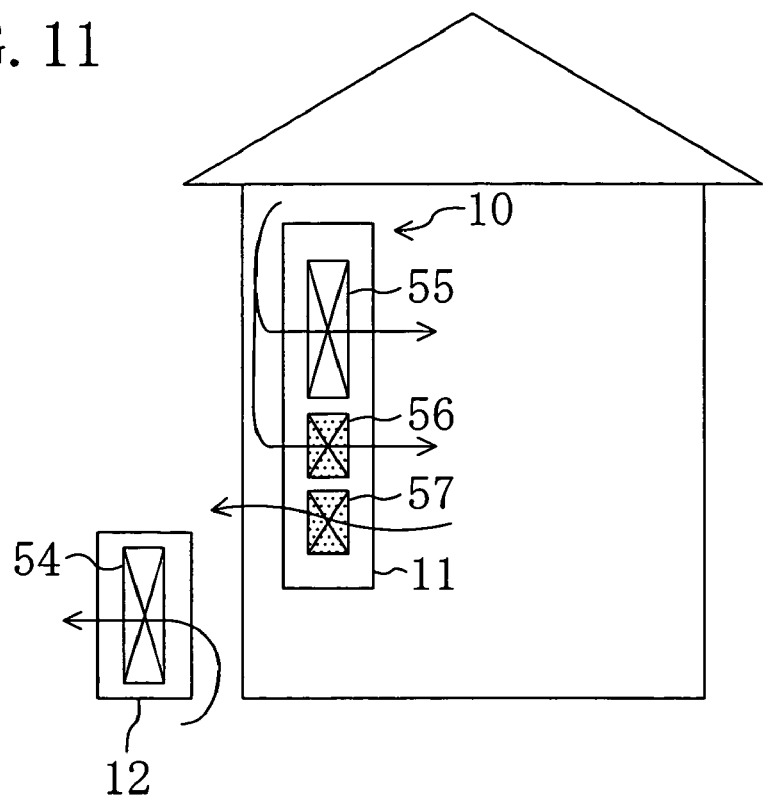
FIG. 11 is a conceptual diagram showing the air flow of an air conditioning system according to Embodiment 3 during a first mode.
Figure 12:
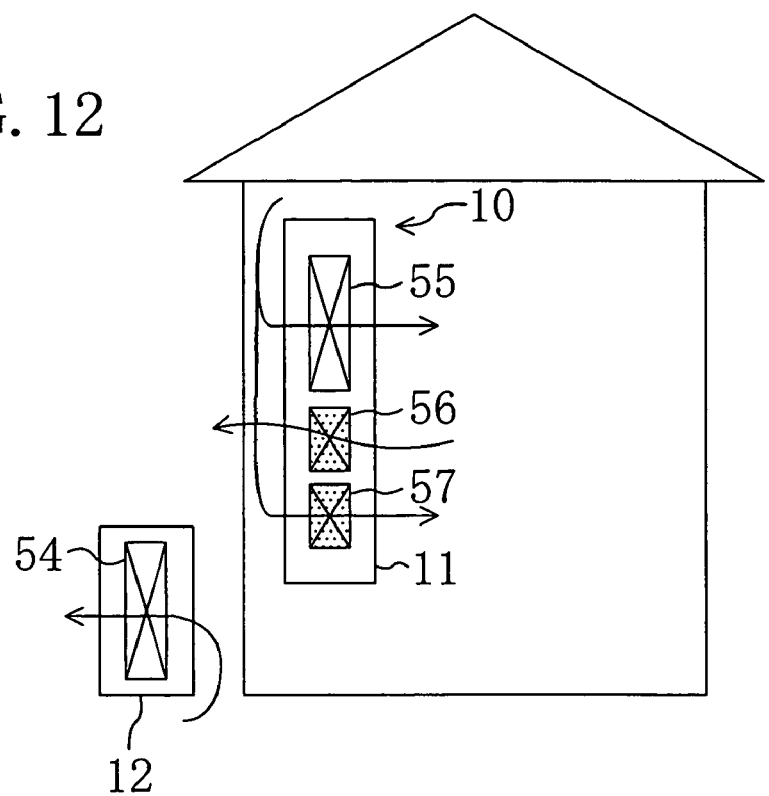
FIG. 12 is a conceptual diagram showing the air flow of the air conditioning system according to Embodiment 3 during a second mode.
Figure 13:
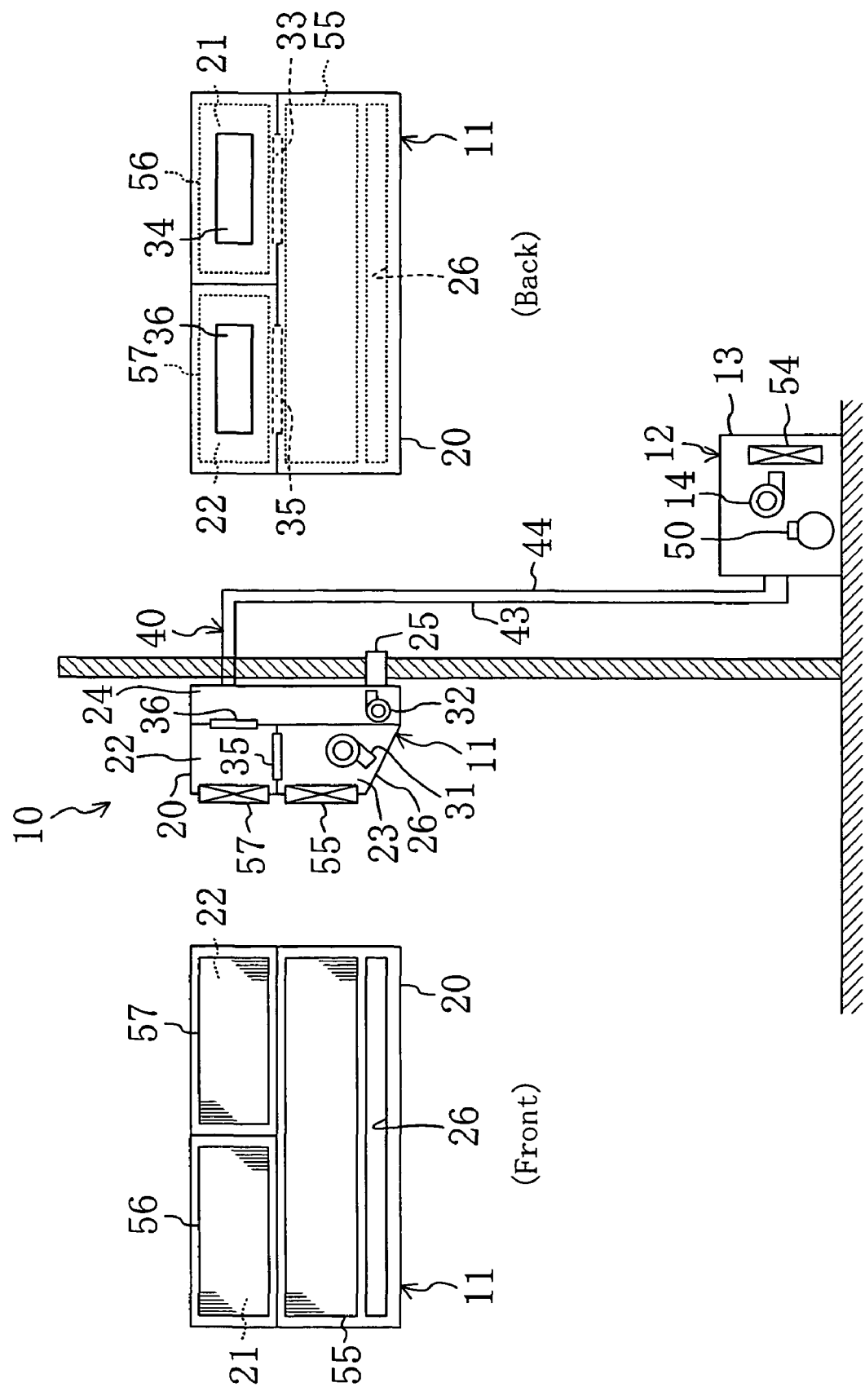
FIG. 13 is a schematic diagram showing the structure of the air conditioning system according to Embodiment 3.

As shown in FIGS. 11 and 12, the air conditioning system (10) is configured as a so-called separate type and includes an indoor unit (11) and an outdoor unit (12). The indoor unit (11) includes the indoor heat exchanger (55) and is disposed in a room space. The indoor unit (11) is configured as a so-called wall-mounted type, namely, is mounted on a wall surface of the room. On the other hand, the outdoor unit (12) includes the outdoor heat exchanger (54), the first adsorption heat exchanger (56) and the second adsorption heat exchanger (57) and is disposed in the outdoor space. Further, as shown in FIG. 13, the indoor unit (11) and the outdoor unit (12) are connected to each other via a gas-side interconnecting line (43) and a liquid-side interconnecting line (44) in the refrigerant circuit (40). In an outdoor casing (13) for the outdoor unit (12), a compressor (50) and an outdoor fan (14) are contained in addition to the outdoor heat exchanger (54).

The indoor unit (11) has an indoor casing (20) formed in the shape of a landscape box. The indoor heat exchanger (55), the first adsorption heat exchanger (56) and the second adsorption heat exchanger (57) are arranged at the front of the indoor casing (20). Specifically, the first adsorption heat exchanger (56) and the second adsorption heat exchanger (57) are arranged side by side in the upper part of the front of the indoor casing (20). When the indoor casing (20) is viewed from the front, the first adsorption heat exchanger (56) and the second adsorption heat exchanger (57) are disposed to the left and right, respectively. Further, at the front of the indoor casing (20), the indoor heat exchanger (55) is arranged below the first adsorption heat exchanger (56) and the second adsorption heat exchanger (57) and an air supply opening (26) is open below the indoor heat exchanger (55).

The inner space of the indoor casing (20) is divided into front and back spaces. The back space in the indoor casing (20) constitutes an exhaust passage (24). The front space in the indoor casing (20) is further divided into upper and lower parts. The lower part of the front space is located to the back of the indoor heat exchanger (55) and constitutes an air supply passage (23). On the other hand, the upper part of the front space is further divided into left and right sides. The left side of the upper part, which is located to the back of the first adsorption heat exchanger (56), constitutes a first adsorption space (21) and the right side of the upper space, which is located to the back of the second adsorption heat exchanger (57), constitutes a second adsorption space (22).

The exhaust passage (24) in the indoor casing (20) contains an exhaust fan (32). Further, the exhaust passage (24) is connected to an exhaust duct (25) open to the outside atmosphere. On the other hand, the air supply passage (23) contains an indoor fan (31). The air supply passage (23) communicates with the air supply opening (26).

The indoor casing (20) is provided with four on-off dampers (33-36). Specifically, a first air supply damper (33) is placed at the divider between the first adsorption space (21) and the air supply passage (23) and s first exhaust damper (34) is placed at the divider between the first adsorption space (21) and the exhaust passage (24). Further, a second air supply damper (35) is placed at the divider between the second adsorption space (22) and the air supply passage (23) and a second exhaust damper (36) is placed at the divider between the second adsorption space (22) and the exhaust passage (24).

Under the above structure, as shown in FIGS. 11 and 12, the air conditioning system (10) is configured to dehumidify or humidify the room space by allowing the air to concurrently flow in parallel flows through the indoor heat exchanger (55) and the adsorption heat exchanger (56, 57) both disposed in the indoor unit (11) and supplying the air having passed through the indoor heat exchanger (55) and the air having passed through the adsorption heat exchanger (56, 57) to the room space.

—Operational Behavior—

The air conditioning system (10) of the present embodiment performs a dehumidification cooling operation and a humidification heating operation. A description, however, is given here to only the dehumidification cooling operation of the air conditioning system (10).

When the indoor fan (31) and the exhaust fan (32) in the air conditioning system (10) are operated, room air flows into each of the indoor heat exchanger (55), the first adsorption heat exchanger (56) and the second adsorption heat exchanger (57). Further, when the outdoor fan (14) is operated, outdoor air flows into the outdoor heat exchanger (54).

During the dehumidification cooling operation, as shown in FIG. 3, in the refrigerant circuit (40), the first four-way selector valve (51) is set to the first position, the opening of the motor-operated expansion valve (53) is appropriately controlled, the outdoor heat exchanger (54) serves as a condenser and the indoor heat exchanger (55) serves as an evaporator. Further, in the air conditioning system (10), a first mode (the state shown in FIG. 3(B)) in which the first adsorption heat exchanger (56) serves as an evaporator and the second adsorption heat exchanger (57) serves as a condenser and a second mode (the state shown in FIG. 3(A)) in which the second adsorption heat exchanger (57) serves as an evaporator and the first adsorption heat exchanger (56) serves as a condenser are repeatedly alternated.

Figure 14:
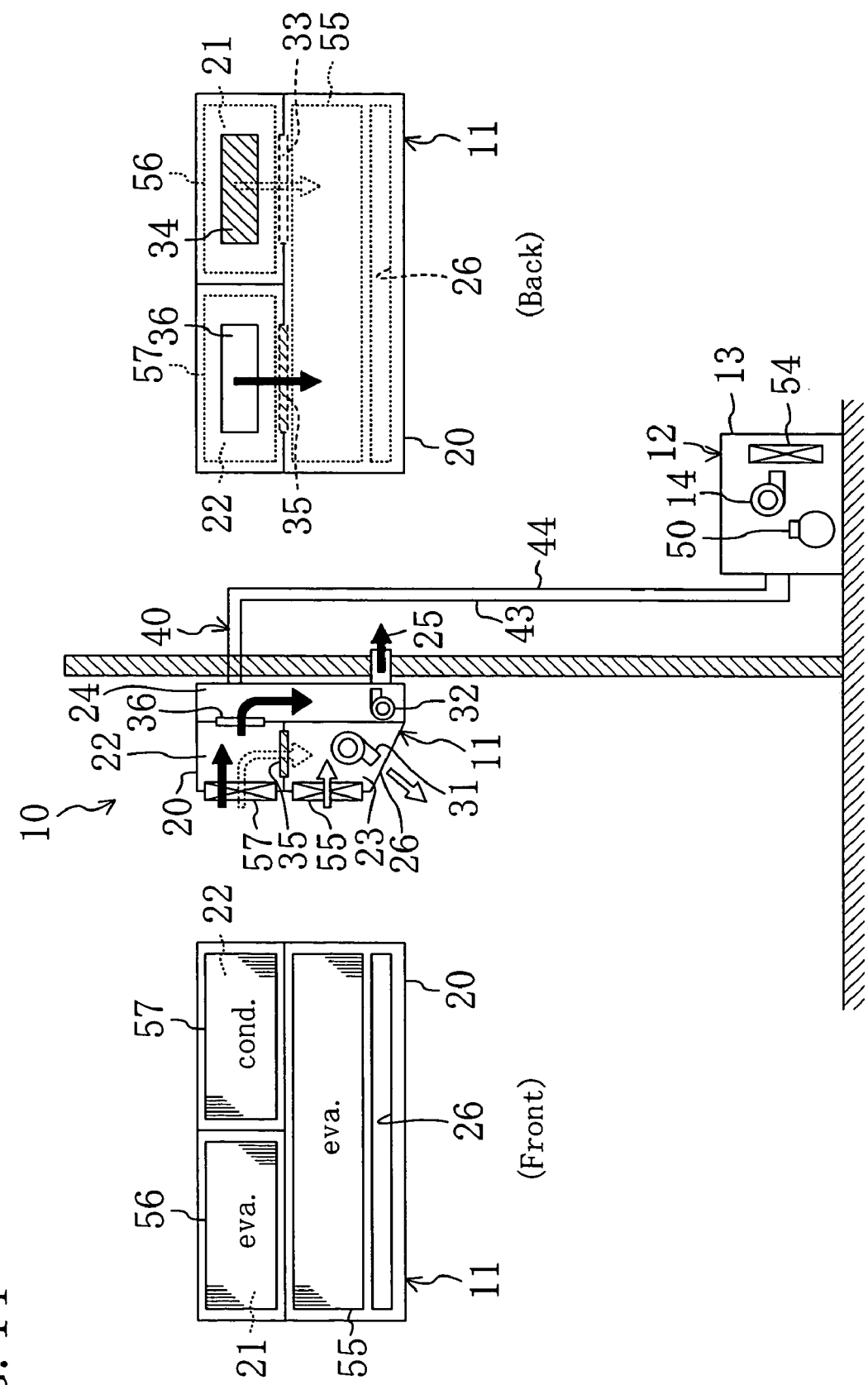
FIG. 14 is a conceptual diagram showing the air flow of the air conditioning system according to Embodiment 3 during the first mode.

During the first mode, as shown in FIG. 14, the first air supply damper (33) and the second exhaust damper (36) are opened and the first exhaust damper (34) and the second air supply damper (35) are closed. The air flow is as shown in FIG. 11.

The air having flowed into the first adsorption heat exchanger (56) is cooled by the first adsorption heat exchanger (56) serving as an evaporator. Further, moisture in the air is adsorbed by the adsorbent of the first adsorption heat exchanger (56), so that the air is dehumidified. The air dehumidified by the first adsorption heat exchanger (56) flows through the first adsorption space (21), the first air supply damper (33) and then into the air supply passage (23). On the other hand, the air having flowed into the indoor heat exchanger (55) is cooled by the indoor heat exchanger (55) serving as an evaporator. Then, the air cooled by the indoor heat exchanger (55) is mixed, in the air supply passage (23), with the air dehumidified and cooled by the first adsorption heat exchanger (56). Then, the mixed air is supplied through the air supply opening (26) to the room space.

The air having flowed into the second adsorption heat exchanger (57) causes moisture in the adsorbent of the second adsorption heat exchanger (57) to be desorbed and the moisture is given to the air. The air having thus generated the second adsorption heat exchanger (57) passes through the second adsorption space (22), the second exhaust damper (36) and then into the exhaust passage (24). Then, the air passes through the exhaust duct (25) and is then discharged to the outdoor space.

Figure 15:
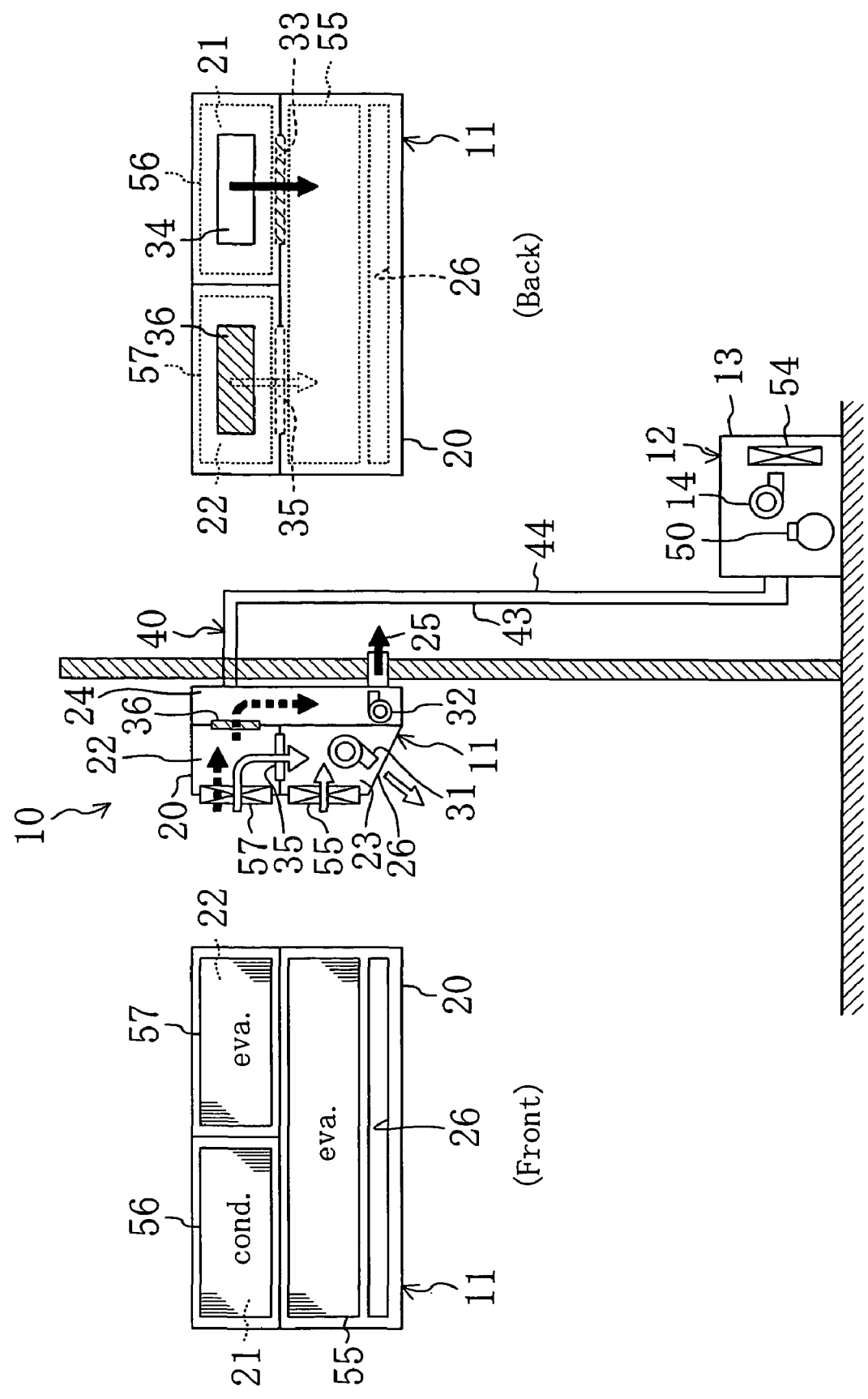
FIG. 15 is a conceptual diagram showing the air flow of the air conditioning system according to Embodiment 3 during the second mode.

During the second mode, as shown in FIG. 15, the first exhaust damper (34) and the second air supply damper (35) are opened and the first air supply damper (33) and the second exhaust damper (36) are closed. The air flow is as shown in FIG. 12.

The air having flowed into the second adsorption heat exchanger (57) is cooled by the second adsorption heat exchanger (57) serving as an evaporator. Further, moisture in the air is adsorbed by the adsorbent of the second adsorption heat exchanger (57), so that the air is dehumidified. The air dehumidified by the second adsorption heat exchanger (57) flows through the second adsorption space (22), the second air supply damper (35) and then into the air supply passage (23). On the other hand, the air having flowed into the indoor heat exchanger (55) is cooled by the indoor heat exchanger (55) serving as an evaporator. Then, the air cooled by the indoor heat exchanger (55) is mixed, in the air supply passage (23), with the air dehumidified and cooled by the second adsorption heat exchanger (57). Then, the mixed air is supplied through the air supply opening (26) to the room space.

The air having flowed into the first adsorption heat exchanger (56) causes moisture in the adsorbent of the first adsorption heat exchanger (56) to be desorbed and the moisture is given to the air. The air having thus generated the first adsorption heat exchanger (56) passes through the first adsorption space (21), the first exhaust damper (34) and then into the exhaust passage (24). Then, the air passes through the exhaust duct (25) and is then discharged to the outdoor space.

—Effects of Embodiment 3—

In Embodiment 3, like Embodiments 1 and 2, the adsorption heat exchangers (56, 57) are disposed in the refrigerant circuit (40) and the air humidity is controlled by passing the air through the adsorption heat exchangers (56, 57). Therefore, in dehumidifying air, the refrigerant evaporation temperature in the refrigeration cycle can be set higher than conventionally done, which reduces the difference between high and low pressures in the refrigeration cycle. As a result, the power consumption of the compressor (50) can be reduced, thereby improving the COP of the refrigeration cycle.

Further, Embodiment 3 is configured to allow the air to concurrently flow in parallel flows through the indoor heat exchanger (55) and the adsorption heat exchanger (56, 57), respectively, and to supply to the room space the flows of air individually coped with by the indoor heat exchanger (55) and the adsorption heat exchanger (56, 57). In this case, the pressure loss produced with air flowing is reduced as compared with when the air sequentially flows through, for example, the adsorption heat exchanger and the indoor heat exchanger. This provides reduced power for the indoor fan (31) and in turn downsizes the indoor fan (31). Therefore, the air conditioning system (10) can have a compact design.

—Modification of Embodiment 3—

Figure 16:
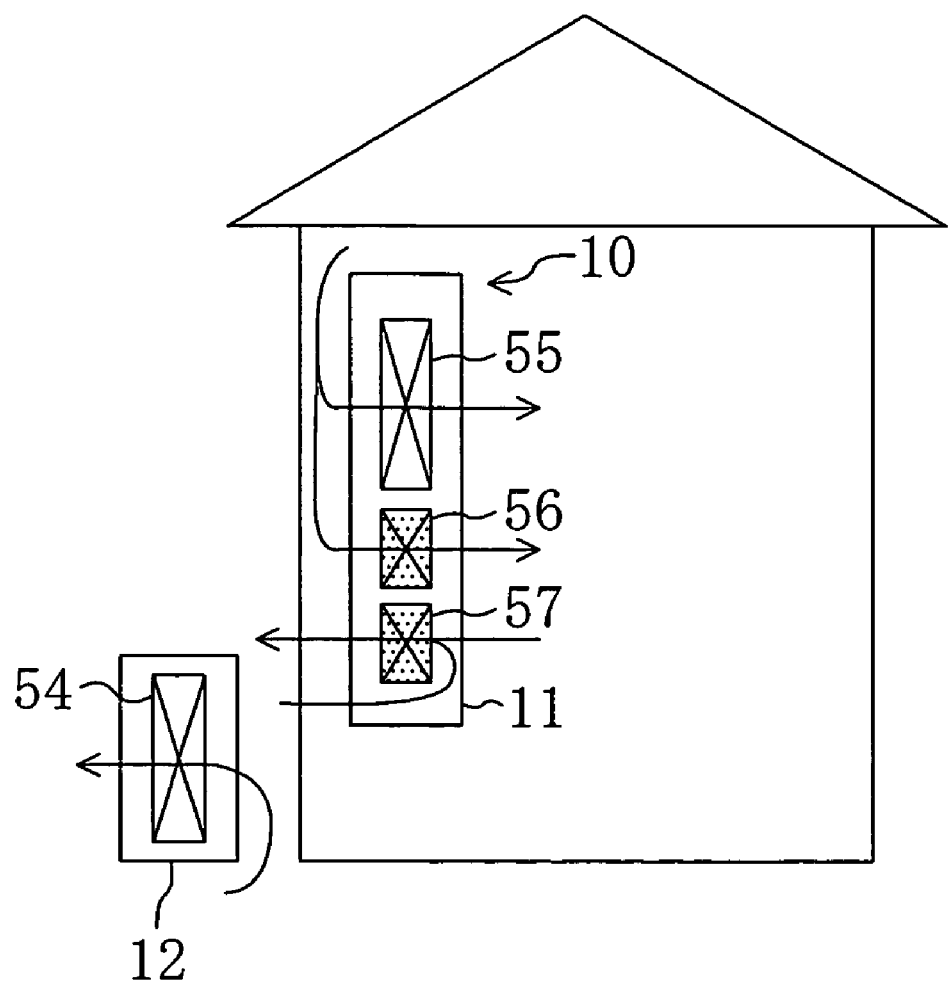
FIG. 16 is a conceptual diagram showing the air flow of the air conditioning system according to Embodiment 3.

This modification varies partly in air flow from the air conditioning system (10) of Embodiment 3. The air conditioning system (10) is configured, as shown in FIG. 16, so that in addition to air exhaust from the room to the outside, the outdoor air taken in from the outside is introduced into one of the adsorption heat exchangers (56, 57) and the air having passed through the one adsorption heat exchanger (56, 57) is discharged to the outside. Thus, during the dehumidification cooling operation, both the room air and the outdoor air are supplied to the adsorption heat exchanger (56, 57) serving as a condenser and both the airs having passed through the adsorption heat exchanger (56, 57) are discharged to the outdoor space. On the other hand, during the humidification heating operation, both the room air and the outdoor air are supplied to the adsorption heat exchanger (56, 57) serving as an evaporator and both the airs having passed through the adsorption heat exchanger (56, 57) are discharged to the outdoor space.

According to this modification, the flow rate of air passing through the adsorption heat exchanger (56, 57) can be set larger than the amount of exhaust air from the room. Therefore, during the dehumidification cooling operation, the adsorption heat exchanger (56, 57) serving as a condenser can be increased in the flow rate of air passing therethrough, which provides a sufficient regeneration of the adsorption heat exchanger (56, 57). On the other hand, during the humidification heating operation, the adsorption heat exchanger (56, 57) serving as an evaporator can be increased in the flow rate of air passing therethrough, which increases the amount of moisture adsorbed by the adsorption heat exchanger (56, 57).

Other Embodiments

The above embodiments may have the following configurations.

As described in the above embodiments, the air conditioning system (10) is configured to take, in supply air to the room space, one of a first air supply pattern in which the air having passed through the adsorption heat exchanger (56, 57) flows through the indoor heat exchanger (55), a second air supply pattern in which the air having passed through the indoor heat exchanger (55) flows through the adsorption heat exchanger (56, 57) and a third air supply pattern in which parallel flows of air concurrently pass through the indoor heat exchanger (55) and the adsorption heat exchanger (56, 57). Further, as described in the above embodiments, the air conditioning system (10) is configured to take, in discharging air to the outdoor space, one of a first exhaust pattern in which the air having passed through the adsorption heat exchanger (56, 57) flows through the outdoor heat exchanger (54), a second exhaust pattern in which the air having passed through the outdoor heat exchanger (54) flows through the adsorption heat exchanger (56, 57) and a third exhaust pattern in which parallel flows of air concurrently pass through the outdoor heat exchanger (54) and the adsorption heat exchanger (56, 57). The combined air supply pattern and exhaust pattern may be any combination of one of the first, second and third air supply patterns and one of the first, second and third exhaust patterns.

Further, the air conditioning system (10) may be configured so that air is supplied to the room space in one of the first, second and third air supply patterns but the air discharge to the outdoor space is implemented by any pattern other than the first, second and third exhaust patterns. Furthermore, the air conditioning system (10) may be configured so that air is discharged to the outdoor space in one of the first, second and third exhaust patterns but the air supply to the room space is implemented by any pattern other than the first, second and third air supply patterns.

Though in the above embodiments two adsorption heat exchangers (56, 57) are disposed in the refrigerant circuit (40), a single adsorption heat exchanger may be disposed therein. In this case, an adsorption action and a regeneration action are repeatedly alternated in the adsorption heat exchanger so that dehumidification or humidification can be implemented in intermittent operation.

Furthermore, in the above embodiments, the refrigerant circuit (40) includes an indoor heat exchanger (55) as a utilization side heat exchanger and an outdoor heat exchanger (54) as a heat-source side heat exchanger. The utilization side heat exchanger, however, may not necessary be disposed in the room space but may be disposed in the outdoor space. On the other hand, the heat-source side heat exchanger may not necessary be disposed in the outdoor space but may be disposed in the room space. Furthermore, a plurality of utilization side heat exchangers and a plurality of heat-source side heat exchangers may be disposed in the refrigerant circuit.

INDUSTRIAL APPLICABILITY

As seen from the above description, the present invention is useful for air conditioning systems for running a refrigeration cycle to cope with indoor sensible heat load and latent heat load.

The invention claimed is:

1. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
the refrigerant circuit is further provided with an adsorption heat exchanger on a surface of which an adsorbent for moisture adsorption thereon and moisture desorption therefrom is carried, and
the air conditioning system is configured to supply air having passed through the adsorption heat exchanger to the room space through the utilization side heat exchanger.

2. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
the refrigerant circuit is further provided with a cross-fin type fin-and-tube adsorption heat exchanger composed of a heat exchanger tube and a plurality of fins, wherein on the surface of the fins an adsorbent for moisture adsorption thereon and moisture desorption therefrom is carried, and
the air conditioning system is configured to supply air having passed through the utilization side heat exchanger to the room space through the adsorption heat exchanger.

3. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
    the refrigerant circuit is further provided with an adsorption heat exchanger on a surface of which an adsorbent for moisture adsorption thereon and moisture desorption therefrom is carried, and
    the air conditioning system is configured to allow the air to concurrently flow in parallel flows through the utilization side heat exchanger and the adsorption heat exchanger and supply the flows of air to the room space.

4. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
    the refrigerant circuit is further provided with a cross-fin type fin-and-tube adsorption heat exchanger composed of a heat exchanger tube and a plurality of fins, wherein on the surface of the fins an adsorbent for moisture adsorption thereon and moisture desorption therefrom is carried, and
    the air conditioning system is configured to discharge air having passed through the adsorption heat exchanger to the outdoor space through the heat-source side heat exchanger.

5. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
    the refrigerant circuit is further provided with a cross-fin type fin-and-tube adsorption heat exchanger composed of a heat exchanger tube and a plurality of fins, wherein on the surface of the fins an adsorbent for moisture adsorption thereon and moisture desorption therefrom is carried, and
    the air conditioning system is configured to discharge air having passed through the heat-source side heat exchanger to the outdoor space through the adsorption heat exchanger.

6. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
    the refrigerant circuit is further provided with an adsorption heat exchanger on a surface of which an adsorbent for moisture adsorption thereon and moisture desorption therefrom is carried, and
    the air conditioning system is configured to allow the air to concurrently flow in parallel flows through the heat-source side heat exchanger and the adsorption heat exchanger and discharge the flows of air to the outdoor space.

7. The air conditioning system of claim 1, wherein
the adsorption heat exchanger comprises a first adsorption heat exchanger and a second adsorption heat exchanger, and
the air conditioning system is configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

8. The air conditioning system of claim 2, wherein
the adsorption heat exchanger comprises a first adsorption heat exchanger and a second adsorption heat exchanger, and
the air conditioning system is configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

9. The air conditioning system of claim 3, wherein
the adsorption heat exchanger comprises a first adsorption heat exchanger and a second adsorption heat exchanger, and
the air conditioning system is configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

10. The air conditioning system of claim 4, wherein
the adsorption heat exchanger comprises a first adsorption heat exchanger and a second adsorption heat exchanger, and
the air conditioning system is configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

11. The air conditioning system of claim 5, wherein
the adsorption heat exchanger comprises a first adsorption heat exchanger and a second adsorption heat exchanger, and
the air conditioning system is configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

12. The air conditioning system of claim 6, wherein
the adsorption heat exchanger comprises a first adsorption heat exchanger and a second adsorption heat exchanger, and
the air conditioning system is configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

13. The air conditioning system of claim 1, wherein the adsorption heat exchanger is a cross-fin type fin-and-tube heat exchanger composed of a heat exchanger tube and a plurality of fins, wherein the adsorbent is carried on the fins.

14. The air conditioning system of claim 3, wherein the adsorption heat exchanger is a cross-fin type fin-and-tube heat exchanger composed of a heat exchanger tube and a plurality of fins, wherein the adsorbent is carried on the fins.

15. The air conditioning system of claim 6, wherein the adsorption heat exchanger is a cross-fin type fin-and-tube heat exchanger composed of a heat exchanger tube and a plurality of fins, wherein the adsorbent is carried on the fins.

16. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
the refrigerant circuit is further provided with a first adsorption heat exchanger and a second adsorption heat exchanger, wherein on the surface of both adsorption heat exchangers an adsorbent for moisture adsorption thereon and moisture desorption therefrom is carried, and
the air conditioning system is configured to supply air having passed through the utilization side heat exchanger to the room space through the first and second adsorption heat exchangers, and wherein
the air conditioning system is further configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

17. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
the refrigerant circuit is further provided with a first adsorption heat exchanger and a second adsorption heat exchanger, wherein on the surface of both adsorption heat exchangers an adsorbent for moisture adsorption thereon and moisture desorption therefrom is carried, and
the air conditioning system is configured to discharge air having passed through the first and second adsorption heat exchangers to the outdoor space through the heat-source side heat exchanger, and wherein
the air conditioning system is further configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

18. An air conditioning system, including a refrigerant circuit provided with a heat-source side heat exchanger and a utilization side heat exchanger, for running a refrigeration cycle in the refrigerant circuit and supplying air having passed through the utilization side heat exchanger to a room space to cope with sensible heat load and latent heat load in the room, wherein
the refrigerant circuit is further provided with a first adsorption heat exchanger and a second adsorption heat exchanger, wherein on the surface of both adsorption heat exchangers an adsorbent for moisture adsorption thereon and moisture desorption therefrom is carried, and
the air conditioning system is configured to discharge air having passed through the heat-source side heat exchanger to the outdoor space through the first and second adsorption heat exchangers, and wherein
the air conditioning system is configured to repeatedly alternate a first mode in which the air having passed through the first adsorption heat exchanger is supplied to the room space and concurrently the air having passed through the second adsorption heat exchanger is discharged to the outdoor space and a second mode in which the air having passed through the second adsorption heat exchanger is supplied to the room space and concurrently the air having passed through the first adsorption heat exchanger is discharged to the outdoor space.

* * * * *